(12) United States Patent
Kawase et al.

(10) Patent No.: US 12,316,255 B1
(45) Date of Patent: May 27, 2025

(54) CONVEYANCE SYSTEM

(71) Applicant: Mitsubishi Electric Corporation, Tokyo (JP)

(72) Inventors: Tatsuya Kawase, Tokyo (JP); Yuji Igarashi, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 18/874,611

(22) PCT Filed: Nov. 11, 2022

(86) PCT No.: PCT/JP2022/042087
§ 371 (c)(1),
(2) Date: Dec. 13, 2024

(87) PCT Pub. No.: WO2024/100885
PCT Pub. Date: May 16, 2024

(51) Int. Cl.
*H02P 5/00* (2016.01)
*B65G 23/23* (2006.01)
(Continued)

(52) U.S. Cl.
CPC ............ *H02P 25/064* (2016.02); *B65G 23/23* (2013.01)

(58) Field of Classification Search
CPC ......... B65G 23/23; B65G 54/02; H01L 21/68; H02P 5/00; H02P 25/064
(Continued)

(56) References Cited

U.S. PATENT DOCUMENTS 5,973,459 A    10/1999   Itoh
6,240,335 B1 *  5/2001   Wehrung ........... G05B 19/4189
                                                    198/577
(Continued)

FOREIGN PATENT DOCUMENTS

EP      3173885 A1 *  5/2017   ............. B23Q 15/24
EP      4130910 A1 *  2/2023   ............. B65B 51/26
(Continued)

OTHER PUBLICATIONS

International Search Report and Written Opinion mailed on Jan. 17, 2023, received for PCT Application No. PCT/JP2022/042087, filed on Nov. 11, 2022, 9 pages including English Translation.
(Continued)

*Primary Examiner* — Douglas A Hess
(74) *Attorney, Agent, or Firm* — XSENSUS LLP

(57) ABSTRACT

A conveyance system includes: a plurality of conveyance path units constituting a conveyance path on which a conveyance body moves, each of the conveyance path units including a plurality of drive units that each generate a thrust for moving the conveyance body by a current flowing therethrough; and a controller including a current command generator that generates a current command for controlling a current flowing through the plurality of drive units. Each of the plurality of conveyance path units controls the current flowing through each of the plurality of drive units in accordance with the current command. The current command generator generates a current command for performing current control of all of the plurality of drive units of each of the conveyance path units at each control cycle when the current command is generated.

13 Claims, 14 Drawing Sheets

(51) Int. Cl.
*B65G 54/02* (2006.01)
*H01L 21/68* (2006.01)
*H02P 25/064* (2016.01)

(58) Field of Classification Search
USPC .............................................. 198/619, 463.2
See application file for complete search history.

(56) References Cited

U.S. PATENT DOCUMENTS

| | | | |
|---|---|---|---|
| 6,283,039 | B1 | 9/2001 | Takayanagi et al. |
| RE39,747 | E * | 7/2007 | Peltier ..................... G01D 5/36 |
| | | | 318/135 |
| 9,254,966 | B2 * | 2/2016 | Fleischmann .......... B65G 43/08 |
| 9,696,706 | B1 * | 7/2017 | Jochim ................ B65D 25/205 |
| 10,608,469 | B2 * | 3/2020 | Floresta .................. H02J 50/30 |
| 10,897,187 | B2 * | 1/2021 | Rothe ..................... B23Q 15/24 |
| 11,165,372 | B2 * | 11/2021 | Huang ..................... H02P 6/006 |
| 11,539,244 | B2 * | 12/2022 | Das ........................ B60L 15/007 |
| 11,705,799 | B2 * | 7/2023 | Rothe .................... B65G 43/10 |
| | | | 700/230 |

| | | | |
|---|---|---|---|
| 2017/0117829 | A1 | 4/2017 | Yamamoto |
| 2021/0249944 | A1 | 8/2021 | Ono et al. |

FOREIGN PATENT DOCUMENTS

| | | |
|---|---|---|
| JP | H09-019178 A | 1/1997 |
| JP | H11-205910 A | 7/1999 |
| JP | 2000-191140 A | 7/2000 |
| JP | 2004-159385 A | 6/2004 |
| JP | 2016-100949 A | 5/2016 |
| JP | 2017-079569 A | 4/2017 |
| JP | 2021-126002 A | 8/2021 |

OTHER PUBLICATIONS

Notification of Reason for Refusal mailed on Aug. 8, 2023, received for JP Application 2023-532838, 6 pages including English Translation.

Decision to Grant a Patent mailed on Decision 05, 2023, received for JP Application 2023-532838, 5 pages including English Translation.

* cited by examiner

FIG.6

| | CONVEYANCE PATH UNIT 11A | | CONVEYANCE PATH UNIT 11B | | | CONVEYANCE PATH UNIT 11H | |
|---|---|---|---|---|---|---|---|
| | COIL 21a | ... | COIL 21i | COIL 21a | ... | COIL 21i | COIL 21a | ... | COIL 21i |
| BUNDLE OF CURRENT COMMANDS $I_{cmdA}$ | $I_{cmdA\_Aa}$ | ... | $I_{cmdA\_Ai}$ | $I_{cmdA\_Ba}$ | ... | $I_{cmdA\_Bi}$ | $I_{cmdA\_Ha}$ | ... | $I_{cmdA\_Hi}$ |
| BUNDLE OF CURRENT COMMANDS $I_{cmdB}$ | $I_{cmdB\_Aa}$ | ... | $I_{cmdB\_Ai}$ | $I_{cmdB\_Ba}$ | ... | $I_{cmdB\_Bi}$ | $I_{cmdB\_Ha}$ | ... | $I_{cmdB\_Hi}$ |
| BUNDLE OF CURRENT COMMANDS $I_{cmdC}$ | $I_{cmdC\_Aa}$ | ... | $I_{cmdC\_Ai}$ | $I_{cmdC\_Ba}$ | ... | $I_{cmdC\_Bi}$ | $I_{cmdC\_Ha}$ | ... | $I_{cmdC\_Hi}$ |
| BUNDLE OF CURRENT COMMANDS $I_{cmd}$ | $I_{tot\_Aa}$ $= I_{cmdA\_Aa}$ $+ I_{cmdB\_Aa}$ $+ I_{cmdC\_Aa}$ | ... | $I_{tot\_Ai}$ $= I_{cmdA\_Ai}$ $+ I_{cmdB\_Ai}$ $+ I_{cmdC\_Ai}$ | $I_{tot\_Ba}$ $= I_{cmdA\_Ba}$ $+ I_{cmdB\_Ba}$ $+ I_{cmdC\_Ba}$ | ... | $I_{tot\_Bi}$ $= I_{cmdA\_Bi}$ $+ I_{cmdB\_Bi}$ $+ I_{cmdC\_Bi}$ | $I_{tot\_Ha}$ $= I_{cmdA\_Ha}$ $+ I_{cmdB\_Ha}$ $+ I_{cmdC\_Ha}$ | ... | $I_{tot\_Hi}$ $= I_{cmdA\_Hi}$ $+ I_{cmdB\_Hi}$ $+ I_{cmdC\_Hi}$ |

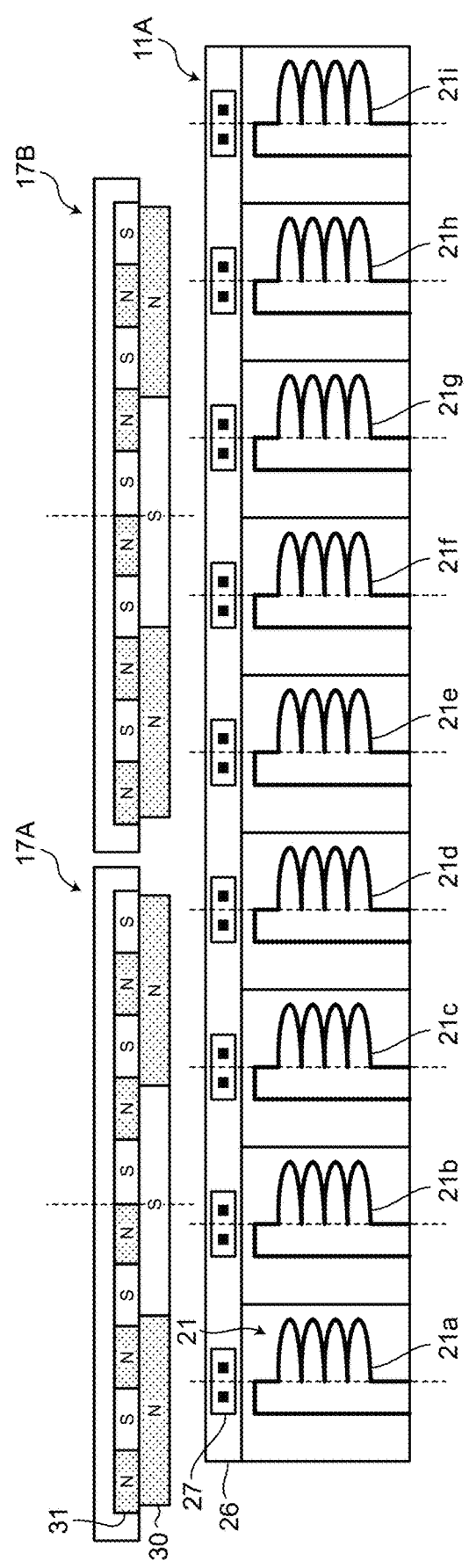

FIG.8

| CARRIER 17 | COIL 21a | COIL 21b | COIL 21c | COIL 21d | COIL 21e | COIL 21f | COIL 21g | COIL 21h | COIL 21i |
|---|---|---|---|---|---|---|---|---|---|
| | CARRIER 17A | CARRIER 17A | CARRIER 17A | CARRIER 17A | CARRIER 17B | CARRIER 17B | CARRIER 17B | CARRIER 17B | CARRIER 17B |
| THRUST COMMAND τ | τA | τA | τA | τA | τB | τB | τB | τB | τB |

CONVEYANCE SYSTEM

CROSS-REFERENCE TO RELATED APPLICATION

The present application is based on PCT filing PCT/JP2022/042087, filed Nov. 11, 2022, the entire contents of which are incorporated herein by reference.

FIELD

The present disclosure relates to a conveyance system that conveys an object.

BACKGROUND

A conveyance system that conveys a workpiece is generally used in a production line in which factory automation is introduced, for example, a production line for assembling industrial products or a production line for packaging food products. In recent years, many conveyance systems have been used in which a conveyance path for conveying workpieces is divided into a plurality of zones, and a carrier on which a workpiece is placed is caused to travel by a control device disposed in each zone. Such a conveyance system is known as one of conveyance systems excellent in terms of production efficiency.

Patent Literature 1 discloses a conveyance system using a linear motor. The conveyance system disclosed in Patent Literature 1 includes a carrier including a magnet and a plurality of coil units arranged on a conveyance path. Each coil unit includes a plurality of coils. The conveyance system disclosed in Patent Literature 1 generates a thrust for moving the carrier by an interaction between a current flowing through the coils and a magnetic field generated by the magnet. According to Patent Literature 1, switches are connected to respective coil units, and the supply of the current to the coils and the interruption of the current flowing to the coils are switched by opening and closing the switches. The conveyance system disclosed in Patent Literature 1 detects a position of the carrier on the conveyance path and selects a coil unit at a position where a thrust can be applied to the carrier. The conveyance system disclosed in Patent Literature 1 supplies a current to the selected coil unit by closing the switches, and interrupts a current to coil units other than the selected coil unit by opening the switches.

CITATION LIST

Patent Literature

Patent Literature 1: Japanese Patent Application Laid-open No. 2017-79569

SUMMARY OF INVENTION

Problem to be Solved by the Invention

In the conveyance system disclosed in Patent Literature 1, the switches are provided separately from a current controller that controls a current flowing to the coils. In the conveyance system disclosed in Patent Literature 1, the switches are necessary, and thus a circuit configuration becomes complicated correspondingly. In addition, in the conveyance system disclosed in Patent Literature 1, it is necessary to generate and output an opening/closing command for controlling the switches separately from a current command to be input to the current controller. According to the technique of Patent Literature 1, in order to generate and output the opening/closing command separately from the current command, processes for controlling the conveyance system become complicated. As described above, in the conveyance system disclosed in Patent Literature 1, the circuit configuration becomes complicated and the processes for controlling the conveyance system become complicated, which is problematic.

The present disclosure has been made in view of the above, and an object thereof is to obtain a conveyance system in which a circuit configuration can be simplified and control can be performed by simple processes.

Means to Solve the Problem

In order to solve the above-described problems and achieve the object, a conveyance system according to the present disclosure includes: a plurality of conveyance path units constituting a conveyance path on which a conveyance body moves, each of the conveyance path units including a plurality of drive units that each generate a thrust for moving the conveyance body by a current flowing therethrough; and a controller including a current command generator that generates a current command for controlling a current flowing through the plurality of drive units. Each of the plurality of conveyance path units controls the current flowing through each of the plurality of drive units in accordance with the current command. The current command generator generates a current command for performing current control of all of the plurality of drive units of each of the conveyance path units at each control cycle when the current command is generated.

Effects of the Invention

The conveyance system according to the present disclosure achieves an effect that a circuit configuration can be simplified and control can be performed by simple processes.

BRIEF DESCRIPTION OF DRAWINGS

FIG. 6 is a diagram illustrating examples of calculation results of current commands by the conveyance system according to the first embodiment.

FIG. 7 is a diagram illustrating an exemplary configuration of the conveyance path unit included in the conveyance system according to a second embodiment.

FIG. 8 is a diagram illustrating an example of a thrust command used to generate a current command for each coil in the conveyance system according to the second embodiment.

DESCRIPTION OF EMBODIMENTS

Hereinafter, a conveyance system according to each embodiment will be described in detail with reference to the drawings.

First Embodiment

Figure 1:
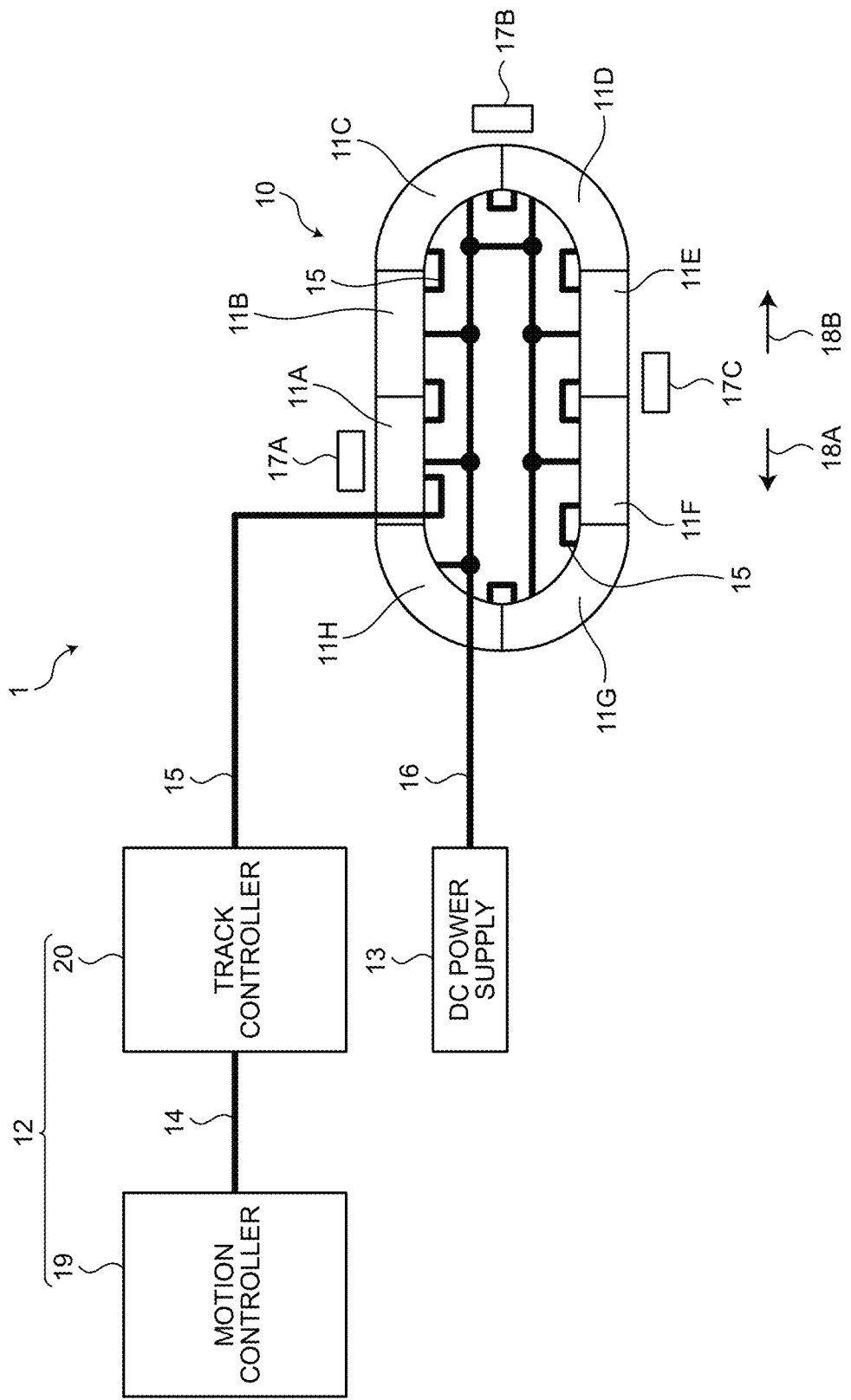
FIG. 1 is a diagram illustrating an exemplary configuration of a conveyance system according to a first embodiment.

FIG. 1 is a diagram illustrating an exemplary configuration of a conveyance system 1 according to a first embodiment The conveyance system 1 is a system used for conveying an object. In the first embodiment, the conveyance system 1 conveys an object by moving a conveyance body on which the object is placed.

The conveyance system 1 includes a plurality of conveyance path units 11A to 11H, a controller 12, a direct-current (DC) power supply 13, and carriers 17A, 17B, and 17C. The controller 12 controls the plurality of conveyance path units 11A to 11H. The controller 12 includes a motion controller 19 and a track controller 20. In the following description, the conveyance path units 11A to 11H are each referred to a conveyance path unit 11 when not being distinguished from each other.

The plurality of conveyance path units 11 are coupled to each other and constitute a conveyance path 10 on which the conveyance body moves. The plurality of conveyance path units 11 move the conveyance body by applying motive power to the conveyance body. Each of the carriers 17A, 17B, and 17C is a conveyance body. In the following description, the carriers 17A, 17B, and 17C are each referred to as a carrier 17 when not being distinguished from each other.

The conveyance path 10 illustrated in FIG. 1 has an annular shape. That is, the conveyance path 10 illustrated in FIG. 1 is a closed path. The conveyance path 10 of the conveyance system 1 may be an open path. That is, the conveyance path 10 of the conveyance system 1 may be a path having a start point and an end point.

The conveyance path units 11A, 11B, 11E, and 11F are each a linear conveyance path unit 11 constituting a linear path. The conveyance path units 11C, 11D, 11G, and 11H are each a curved conveyance path unit 11 constituting a curved path, and change the traveling direction of the conveyance body. The conveyance path 10 may include only the conveyance path units 11 each constituting a curved path without including the conveyance path units 11 each constituting a linear path. Any shape may be employed as the entire shape of the conveyance path 10.

The carrier 17 is attached to a side surface of the conveyance path 10. The carrier 17 moves along a guide rail provided on the side surface of the conveyance path 10. The carrier 17 moves on the side surface of the conveyance path 10 and stops on the side surface of the conveyance path 10. The conveyance system 1 according to the first embodiment is a moving magnet type linear motor. The carrier 17 may move along a guide rail provided on an upper surface of the conveyance path 10. The carrier 17 includes a permanent magnet constituting a mover, a permanent magnet for a linear scale, and a guide roller that moves on the guide rail by rotation. In FIG. 1, the guide rail, the guide roller, the permanent magnet constituting a mover, and the permanent magnet for a linear scale are not illustrated.

A traveling direction of each carrier 17 is a clockwise direction in FIG. 1 or a counterclockwise direction in FIG. 1. Among the traveling directions, the clockwise direction in FIG. 1 is defined as a forward direction. Among the traveling directions, the counterclockwise direction in FIG. 1 is defined as a reverse direction. An arrow 18A indicates the forward direction. An arrow 18B indicates the reverse direction.

In the example illustrated in FIG. 1, the conveyance system 1 includes eight conveyance path units 11 and three carriers 17. There may be any number of conveyance path units 11 included in the conveyance system 1. That is, there may be any number of conveyance path units 11 constituting the conveyance path 10. The conveyance system 1 is only required to include a plurality of conveyance path units 11. There may be any number of carriers 17 moving on the conveyance path 10. The conveyance system 1 is only required to include one or a plurality of carriers 17.

The conveyance system 1 is not limited to a system including a linear motor, and may be a system including a rotary motor. The conveyance system 1 may be a belt conveyor including a rotary motor and a belt rotated by the rotary motor. The belt conveyor moves a workpiece placed on the belt. The conveyance system 1 may be a roller conveyor including a plurality of rollers and a rotary motor that rotates the rollers. The roller conveyor moves a workpiece placed on the rollers.

The DC power supply 13 is connected to each conveyance path unit 11 via a DC power supply bus 16. The DC power supply 13 is a power supply device or a power supply circuit that outputs a direct-current voltage. The DC power supply 13 supplies power to each conveyance path unit 11. Each conveyance path unit 11 shares the DC power supply 13.

A direct-current bus on a positive side and a direct-current bus on a negative side pass through the DC power supply bus 16. The direct-current bus on the positive side is referred to as a P bus. The direct-current bus on the negative side is referred to as an N bus. The P bus is connected to a positive electrode of the DC power supply 13. The N bus is connected to a negative electrode of the DC power supply 13. Hereinafter, when both the P bus and the N bus are referred to, the buses are referred to as PN buses. Each of the plurality of conveyance path units 11 constituting the conveyance path 10 is connected to common PN buses.

The conveyance system 1 has a configuration in which each conveyance path unit 11 is connected to the DC power supply 13 by a multi-drop connection. The connection form between each conveyance path unit 11 and the DC power supply 13 is not limited to the multi-drop connection, and may be a daisy chain connection. In the example illustrated in FIG. 1, the conveyance system 1 includes one DC power supply 13, but the conveyance system 1 may include two or more DC power supplies 13. That is, a plurality of power supply domains may be configured in the conveyance system 1.

The track controller 20 is connected to each conveyance path unit 11 via a data communication line 15. The data communication line 15 includes a line connecting the track controller 20 and the conveyance path unit 11A which is one of the plurality of conveyance path units 11, and lines connecting the conveyance path units 11 adjacent to each other. The conveyance system 1 has a configuration in which each conveyance path unit 11 is connected to the track controller 20 by a daisy chain connection. A connection form between each conveyance path unit 11 and the track controller 20 is not limited to the daisy chain connection. The connection form between each conveyance path unit 11 and the track controller 20 may be a star connection in which each conveyance path unit 11 is connected to the track controller 20 via a communication hub. Alternatively, the conveyance system 1 may include a plurality of data communication lines 15, and each conveyance path unit 11 and the track controller 20 may be directly connected by the data communication line 15.

The motion controller 19 is connected to the track controller 20 via a data communication line 14. The motion controller 19 periodically generates a position command indicating a position to which each carrier 17 is moved. The motion controller 19 transmits the generated position command to the track controller 20. Details of the track controller 20 will be described later.

The conveyance system 1 illustrated in FIG. 1 includes one motion controller 19 and one track controller 20. The conveyance system 1 may include two or more track controllers 20, and each track controller 20 may be connected to the motion controller 19. One or two or more conveyance path units 11 are connected to each track controller 20, A communication protocol between the motion controller 19 and the track controller 20 and a communication protocol between the track controller 20 and each conveyance path unit 11 may be the same or different from each other.

A higher-level control device than the controller 12, such as a programmable logic controller, may be connected to the motion controller 19. The control device outputs a command for sequence control to the motion controller 19. A human-machine interface may be connected to the motion controller 19. The human-machine interface receives an input from an operator. In addition, the human-machine interface outputs information indicating the status of the conveyance system 1 by display or the like. The motion controller 19 may acquire operation information of the carriers 17 from the higher-level control device or the human-machine interface, and generate the position command on the basis of the operation information. The operation information is information indicating a schedule for movement of each of the plurality of carriers 17 on the conveyance path 10.

Next, a configuration of the conveyance path unit 11 will be described. Here, the configuration of the conveyance path unit 11 will be described by taking the linear conveyance path unit 11 as an example. The curved conveyance path unit 11 is different from the linear conveyance path unit 11 in how coils are disposed. The configuration of the curved conveyance path unit 11 is similar to the configuration of the linear conveyance path unit 11 except the difference in how coils are disposed.

Figure 2:
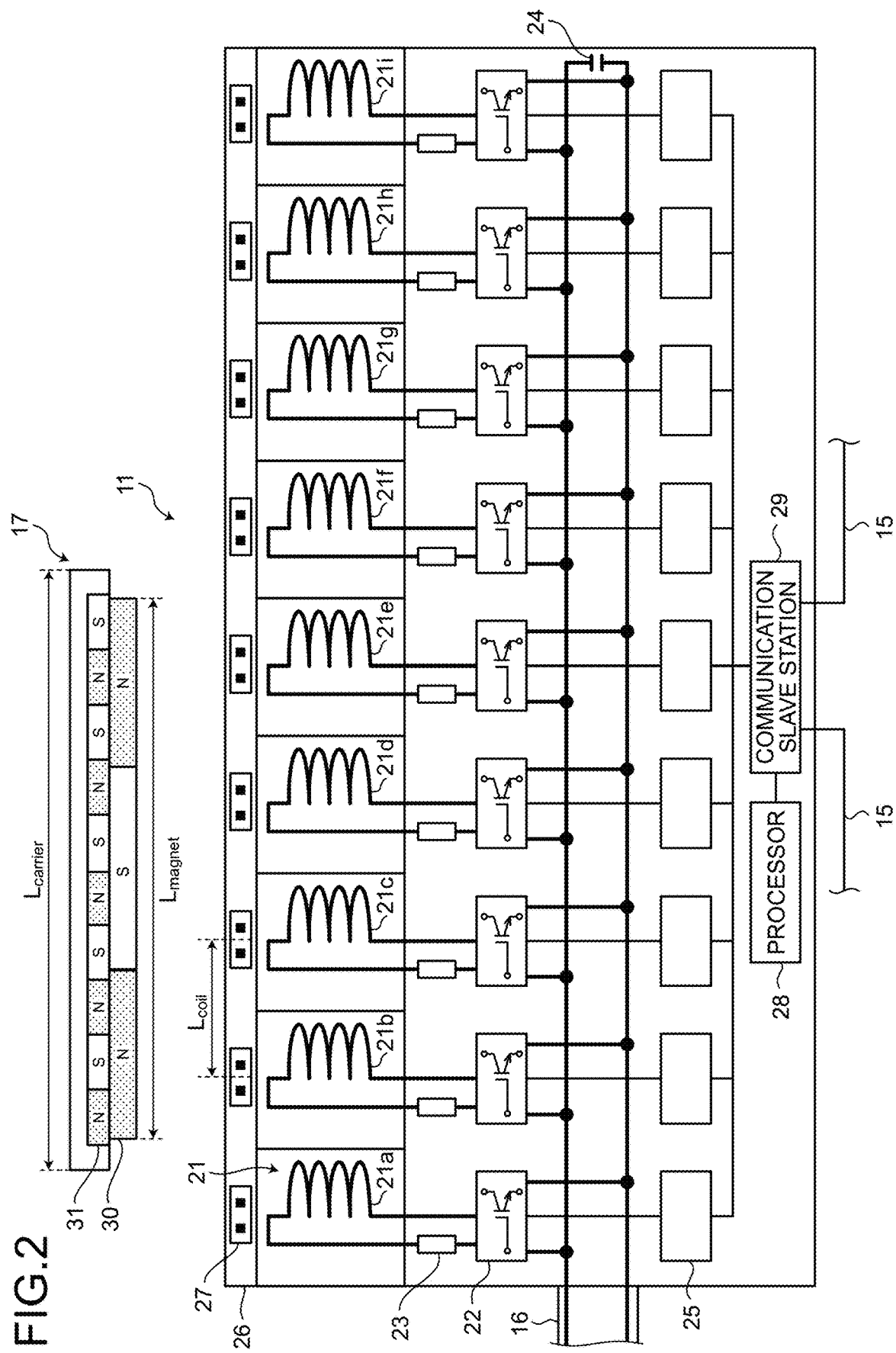
FIG. 2 is a diagram illustrating an exemplary configuration of a conveyance path unit included in the conveyance system according to the first embodiment.

FIG. 2 is a diagram illustrating an exemplary configuration of the conveyance path unit 11 included in the conveyance system 1 according to the first embodiment. FIG. 2 illustrates the conveyance path unit 11 and permanent magnets 30 and 31 included in the carrier 17. The permanent magnet 30 is a permanent magnet constituting a mover. The permanent magnet 31 is a permanent magnet for a linear scale.

The conveyance path unit 11 includes a plurality of coils 21a to 21i. In the following description, the coils 21a to 21i are each referred to as a coil 21 when not being distinguished from each other. Each coil 21 functions as a drive unit that generates a thrust by a current flowing therethrough. Each coil 21 generates an electromagnetic force which is a thrust by an interaction between a current and a magnetic field generated by the permanent magnet 30.

In the example illustrated in FIG. 2, the conveyance path unit 11 includes nine coils 21. There may be any number of coils 21 included in the conveyance path unit 11. In the linear conveyance path unit 11, the plurality of coils 21 are arranged in a direction of the line. In the curved conveyance path unit 11, the plurality of coils 21 are arranged in a direction of the curve.

An inverter circuit 22 is connected to each of the coils 21 of the conveyance path unit 11. The inverter circuit 22 includes switching elements, and supplies the coil 21 with power subjected to power conversion by switching of the switching elements. The switching elements are not illustrated. The inverter circuit 22 controls a current flowing through the coil 21. The inverter circuit 22 is a single-phase full-bridge inverter circuit or a single-phase half-bridge inverter circuit. The inverter circuit 22 may be a three-phase inverter circuit connected to three coils 21. Each of the coils 21 of the conveyance path unit 11 includes not only a pure inductance component but also coil resistance.

Each inverter circuit 22 of the conveyance path unit 11 is connected between the P bus and the N bus. Each inverter circuit 22 converts direct-current power from the PN buses into alternating-current power and supplies the alternating current power to the coil 21. The inverter circuit 22 performs power conversion from direct-current power to alternating-current power by switching of the switching elements.

With the supply of the power converted by the inverter circuit 22, the coil 21 generates an electromagnetic force which is a thrust for moving the carrier 17. A current sensor 23 is connected to each coil 21 of the conveyance path unit 11. The current sensor 23 detects a coil actual current value which is a current value of a current flowing through the coil 21. In the conveyance path unit 11, a capacitor 24 which is an electrolytic capacitor is connected between the P bus and the N bus.

To each of the inverter circuits 22 of the conveyance path unit 11, a current controller 25 that controls the inverter circuit 22 is connected. The current controller 25 calculates a voltage value of a voltage to be applied to the coil 21 on the basis of a current command value of the current flowing through the coil 21 and the coil actual current value detected by the current sensor 23. The current controller 25 transmits, to the inverter circuit 22, a pulse width modulation (PWM) signal obtained by comparing the calculated voltage value with a triangular waveform. The current controller 25 transmits the PWM signal to the inverter circuit 22 to thereby cause the inverter circuit 22 to perform switching. Consequently, the current controller 25 applies, to the coil 21, a voltage for causing a current of a desired current value to flow through the coil 21. The current controller 25 may calculate the voltage value of the voltage to be applied to the coil 21 by performing proportional integral differential (PID) control of the voltage to be applied to the coil 21 on the basis of a deviation between the current command value and the coil actual current value.

A disposition interval of the plurality of coils 21 in the traveling direction of the carrier 17 is denoted by $L_{coil}$. It can also be said that $L_{coil}$ is a distance between the center positions of the coils 21 adjacent to each other in the conveyance path unit 11. $D_{carrier}$ is the length of the carrier 17 in the traveling direction of the carrier 17. $L_{coil}$ is shorter than $L_{carrier}$. Consequently, each carrier 17 can obtain a thrust by an interaction between magnetic fluxes generated by two or more coils 21.

The length of the permanent magnet 30 in the traveling direction of the carrier 17 is denoted by $L_{magnet}$. $L_{magnet}$ is a length from one end of the permanent magnet 30 to another end of the permanent magnet 30 in the traveling direction of the carrier 17. In a case where N poles and S poles are alternately disposed as illustrated in FIG. 2, $L_{magnet}$ is the length of the entire permanent magnet 30 including all magnetic poles in the traveling direction of the carrier 17. In a case where there is a space between a magnetic pole and a magnetic pole, $L_{magnet}$ also includes the length of the space.

$L_{magnet}$ is shorter than $L_{carrier}$. Since $L_{magnet}$ is shorter than $L_{carrier}$, in a case where two carriers 17 approach each other, a space is provided between the permanent magnet 30 of one carrier 17 and the permanent magnet 30 of the other carrier 17, Since the space is provided between the permanent magnet 30 of one carrier 17 and the permanent magnet 30 of the other carrier 17, it is possible to avoid a state in which the permanent magnet 30 of one carrier 17 and the permanent magnet 30 of the other carrier 17 are present on one coil 21. Since the permanent magnet 30 present on one coil 21 is the permanent magnet 30 of one carrier 17, a calculation of a current command for generating a magnetic flux in one coil 21 can be set as a calculation for one carrier 17, On the other hand, in a case where it is necessary to set the calculation of the current command for generating the magnetic flux in one coil 21 as the calculation for two carriers 17, the calculation of the current command becomes complicated.

According to the first embodiment, since $L_{magnet}$ is shorter than $L_{carrier}$, the conveyance system 1 can set the calculation of the current command for generating the magnetic flux in one coil 21 as the calculation for one carrier 17. Therefore, the conveyance system 1 can prevent the calculation of the current command from becoming complicated.

The conveyance path unit 11 includes a linear scale 26, a processor 28, and a communication slave station 29. The linear scale 26 is a sensing unit that senses a position of the carrier 17 on the conveyance path unit 11. The linear scale 26 is provided on the conveyance path 10 by the plurality of conveyance path units 11 coupled to each other to form the conveyance path 10. The processor 28 is a central processing unit (CPU). The processor 28 may be an arithmetic device, a processing device, a microprocessor, a microcomputer, or a digital signal processor (DSP).

The linear scale 26 includes a plurality of position sensors 27. Each position sensor 27 is a sensor that detects a magnetic field, such as a Hall sensor or a magnetoresistive sensor. Each position sensor 27 detects a magnetic field of the permanent magnet 30 or a magnetic field of the permanent magnet 31, Here, the position sensor 27 is a Hall sensor on which two Hall elements are mounted. An interval between the two Hall elements is an interval corresponding to half of a magnetic pole pitch of the permanent magnet 31. Each Hall element converts a magnetic field into an electrical signal and outputs the electrical signal. The electrical signal output from each Hall element changes with the movement of the carrier 17. The electrical signal output from one Hall element has a waveform of a sin wave. The electrical signal output from the other Hall element has a waveform of a cos wave.

The electrical signal from each position sensor 27 of the linear scale 26 is input to the processor 28. An analog to digital (AD) converter included in the processor 28 detects the sin wave and the cos wave. The processor 28 detects the position of the carrier 17 with respect to the position sensor 27 by calculating arctan on the basis of information on the sin wave and information on the cos wave. Consequently, the processor 28 acquires position sensor information indicating the relative position of the carrier 17 with respect to the position sensor 27. In FIG. 2, a communication line of the electrical signal between each position sensor 27 and the processor 28 is not illustrated.

The communication slave station 29 is a communication slave station on a side of the conveyance path unit 11, The data communication line 15 is connected to the communication slave station 29. In a case where each conveyance path unit 11 and the track controller 20 are connected by the daisy chain connection, the communication slave station 29 is configured to be able to connect two lines constituting the data communication lines 15. For each of the plurality of coils 21 included in the conveyance path unit 11, the communication slave station 29 receives, from the track controller 20, a current command indicating a command value of a current to be caused to flow through the coil 21. The communication slave station 29 transmits the current command to each of the plurality of current controllers 25 of the conveyance path unit 11. Consequently, the conveyance path unit 11 controls the current flowing through each of the plurality of coils 21 in accordance with the current command.

The communication slave station 29 acquires the position sensor information from the processor 28. The communication slave station 29 transmits the acquired position sensor information to the track controller 20.

The communication slave station 29 performs, for example, fixed-cycle communication in which a current command is received and position sensor information is transmitted in a fixed-cycle. The communication slave station 29 may aperiodically perform the reception of the current command and the transmission of the position sensor information instead of the fixed-cycle communication.

As described above, the conveyance path unit 11 mainly has a function of performing energization control of the coils 21 and a function of acquiring position sensor information. Each of the plurality of conveyance path units 11 constituting the conveyance path 10 similarly performs energization control of the coils 21 and similarly acquires position sensor information.

Figure 3:
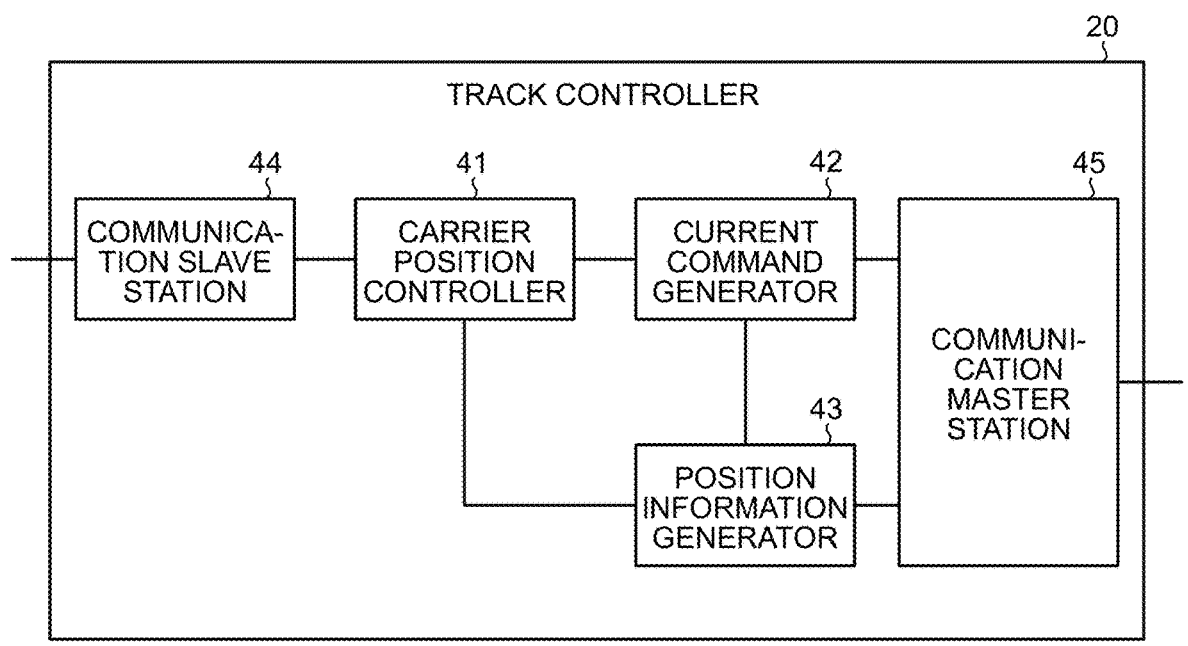
FIG. 3 is a diagram illustrating an exemplary configuration of a track controller included in the conveyance system according to the first embodiment.

Next, a configuration of the track controller 20 will be described. FIG. 3 is a diagram illustrating an exemplary configuration of the track controller 20 included in the conveyance system 1 according to the first embodiment. The track controller 20 includes a carrier position controller 41, a current command generator 42, a position information generator 43, a communication slave station 44, and a communication master station 45.

The communication slave station 44 is a communication slave station on a track controller 20 side. The communication slave station 44 receives a position command from the motion controller 19. In the first embodiment, the communication slave station 44 receives position commands for the carriers 17A, 17B, and 17C of the conveyance path units 11. The communication slave station 44 receives a position command for each carrier 17 of the conveyance path units 11, and outputs the received position command to the carrier position controller 41.

The communication master station 45 is a communication master station on the track controller 20 side. The communication master station 45 receives the position sensor information from the communication slave station 29 of each conveyance path unit 11. That is, the communication master station 45 receives the position sensor information acquired by the processor 28 of each conveyance path unit 11. The communication master station 45 outputs the received position sensor information to the position information generator 43.

The position information generator 43 acquires the position sensor information from each conveyance path unit 11 and calculates the position of each carrier 17 on the basis of the acquired position sensor information. The position information generator 43 generates position information indicating the actual position of each carrier 17 on the conveyance path 10. In the first embodiment, the position information generator 43 generates the position information of the carriers 17A, 17B, and 17C indicating the actual positions of the carriers 17A, 17B, and 17C on the conveyance path 10. The position information generator 43 generates the position information of each carrier 17 of the conveyance system 1, and outputs the generated position information to the carrier position controller 41 and the current command generator 42.

The carrier position controller 41 acquires the position command of each carrier 17 and the position information of each carrier 17. The carrier position controller 41 generates a thrust command of each carrier 17 on the basis of a difference between the position command and the position information. In the first embodiment, the carrier position controller 41 generates the thrust command of the carrier 17A on the basis of a difference between the position command of the carrier 17A and the position information of the carrier 17A. The carrier position controller 41 generates a thrust command of the carrier 17B on the basis of a difference between the position command of the carrier 17B and the position information of the carrier 17B. The carrier position controller 41 generates a thrust command of the carrier 17C on the basis of a difference between the position command of the carrier 17C and the position information of the carrier 17C. The carrier position controller 41 outputs the generated thrust commands to the current command generator 42.

The current command generator 42 acquires the thrust command of each carrier 17 and the position information of each carrier 17. The current command generator 42 generates current commands for controlling a current flowing through the plurality of coils 21 on the basis of the thrust commands and the position information. In each control cycle when a current command is generated in the track controller 20, the current command generator 42 generates current commands for performing current control of all of the plurality of coils 21 of each conveyance path unit 11. Here, regarding the "control cycle", one control cycle is from the generation of the position information of the carrier 17 by the position information generator 43 to the generation of the current commands for the coils 21 of each conveyance path unit 11 by the current command generator 42. That is, the current command generator 42 of the first embodiment generates current commands for all of the plurality of coils 21 of each conveyance path unit 11 in each control cycle when a current command is generated. The current command generator 42 outputs the generated current commands to the communication master station 45. The communication master station 45 transmits the current commands to the communication slave station 29 of each conveyance path unit 11. In the following description, a group of current commands, each of the current commands being a current command for one of the plurality of coils 21 included in the conveyance path unit 11, is referred to as a bundle of current commands. The communication master station 45 transmits the bundle of current commands to the communication slave station 29 of each conveyance path unit 11.

The current commands generated by the current command generator 42 include a current command in a case where the current flowing through the coil 21 is set to zero. Regarding the expression "generates current commands for performing current control of all of the plurality of coils 21 of each conveyance path unit 11", a case is included where a current command value for at least one of the plurality of coils 21 is set to zero.

Figure 4:
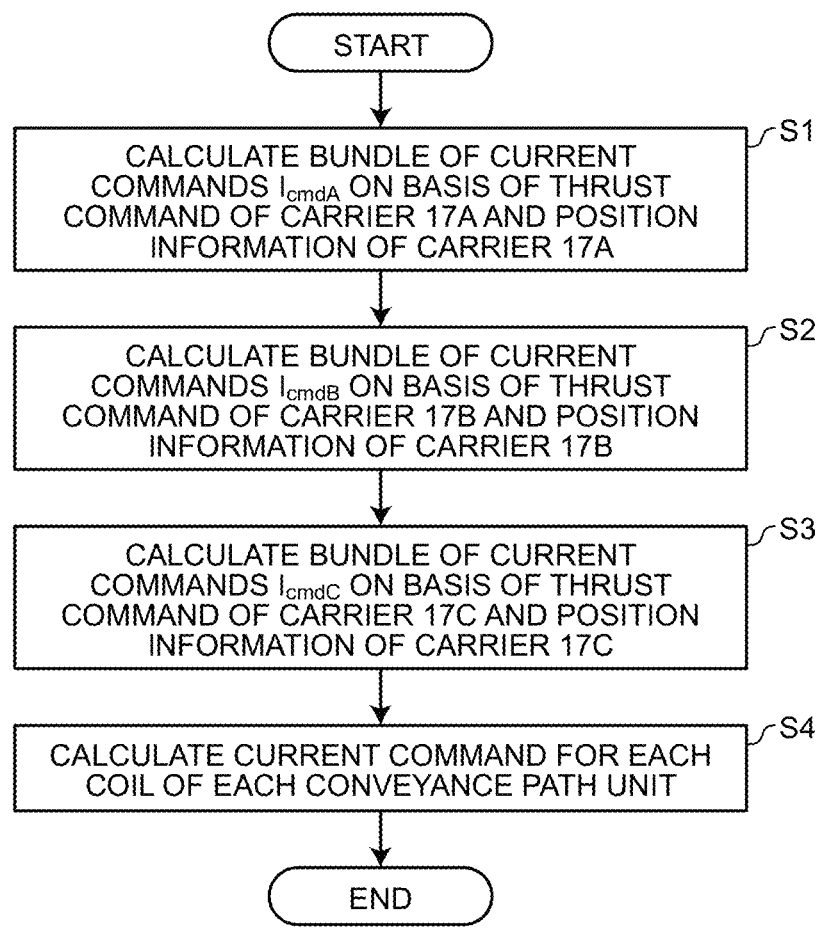
FIG. 4 is a flowchart illustrating a processing procedure by a current command generator of the conveyance system according to the first embodiment.

Next, details of processes by the current command generator 42 will be described. FIG. 4 is a flowchart illustrating a processing procedure by the current command generator 42 of the conveyance system 1 according to the first embodiment. FIG. 4 illustrates a procedure of processes executed by the current command generator 42 for each control cycle.

In step S1, the current command generator 42 calculates a bundle of current commands $I_{cmdA}$ on the basis of the thrust command of the carrier 17A and the position information of the carrier 17A. The bundle of current commands $I_{cmdA}$ is a group of current commands for generating a thrust for moving the carrier 17A. The current command generator 42 generates the bundle of current commands $I_{cmdA}$ in which current commands for all the coils 21 of each conveyance path unit 11 are bundled.

In step S2, the current command generator 42 calculates a bundle of current commands $I_{cmdB}$ on the basis of the thrust command of the carrier 17B and the position information of the carrier 17B. The bundle of current commands $I_{cmdB}$ is a group of current commands for generating a thrust for moving the carrier 17B. The current command generator 42 generates the bundle of current commands $I_{cmdB}$ in which current commands for all the coils 21 of each conveyance path unit 11 are bundled.

In step S3, the current command generator 42 calculates a bundle of current commands $I_{cmdC}$ on the basis of the thrust command of the carrier 17C and the position information of the carrier 17C. The bundle of current commands $I_{cmdC}$ is a group of current commands for generating a thrust for moving the carrier 17C. The current command generator 42 generates the bundle of current commands $I_{cmdC}$ in which current commands for all the coils 21 of each conveyance path unit 11 are bundled.

In step S4, the current command generator 42 calculates a current command for each coil 21 of each conveyance path unit 11 by using the bundles of current commands $I_{cmdA}$, $I_{cmdB}$, and $I_{cmdC}$ calculated in steps S1 to S3. The current command generator 42 adds up current commands for the same coil 21 among the bundles of current commands $I_{cmdA}$, $I_{cmdB}$, and $I_{cmdC}$ to calculate a current command $I_{tot}$ for each of the coils 21 of each conveyance path unit 11. As described above, the current command generator 42 obtains the current commands for respective carriers 17 for each of the coils 21, and adds up the current commands for respective carriers 17 for each of the coils 21 to generate the current command for each coil 21.

The current command generator 42 generates a bundle of current commands $I_{cmd}$ in which current commands $I_{tot}$ for all the coils 21 of each conveyance path unit 11 are bundled. The bundle of current commands $I_{cmd}$ is a group of current commands for generating thrusts for moving all the carriers 17A, 17B, and 17C of the conveyance system 1. The current command generator 42 outputs the generated bundle of current commands $I_{cmd}$. Thus, the current command generator 42 ends the processes in accordance with the procedure illustrated in FIG. 4. The current command generator 42 repeats the processes in accordance with the procedure illustrated in FIG. 4 for each control cycle.

Here, an example of a method for calculating the bundles of current commands $I_{cmdA}$, $I_{cmdB}$, and $I_{cmdC}$ by the current command generator 42 will be described. In the following description, a current command for each of the coils 21 of each conveyance path unit 11 for generating the thrust for moving the carrier 17A is expressed as "$I_{cmdA}$_Aa" or the like. "Aa" in "$I_{cmdA}$_Aa" indicates that it is the current command for the coil 21a of the conveyance path unit 11A. For each coil 21 other than the coil 21a of the conveyance path unit 11A, the current command for each of the coils 21 is expressed in the same manner as in the case of the coil 21a of the conveyance path unit 11A.

Figure 5:
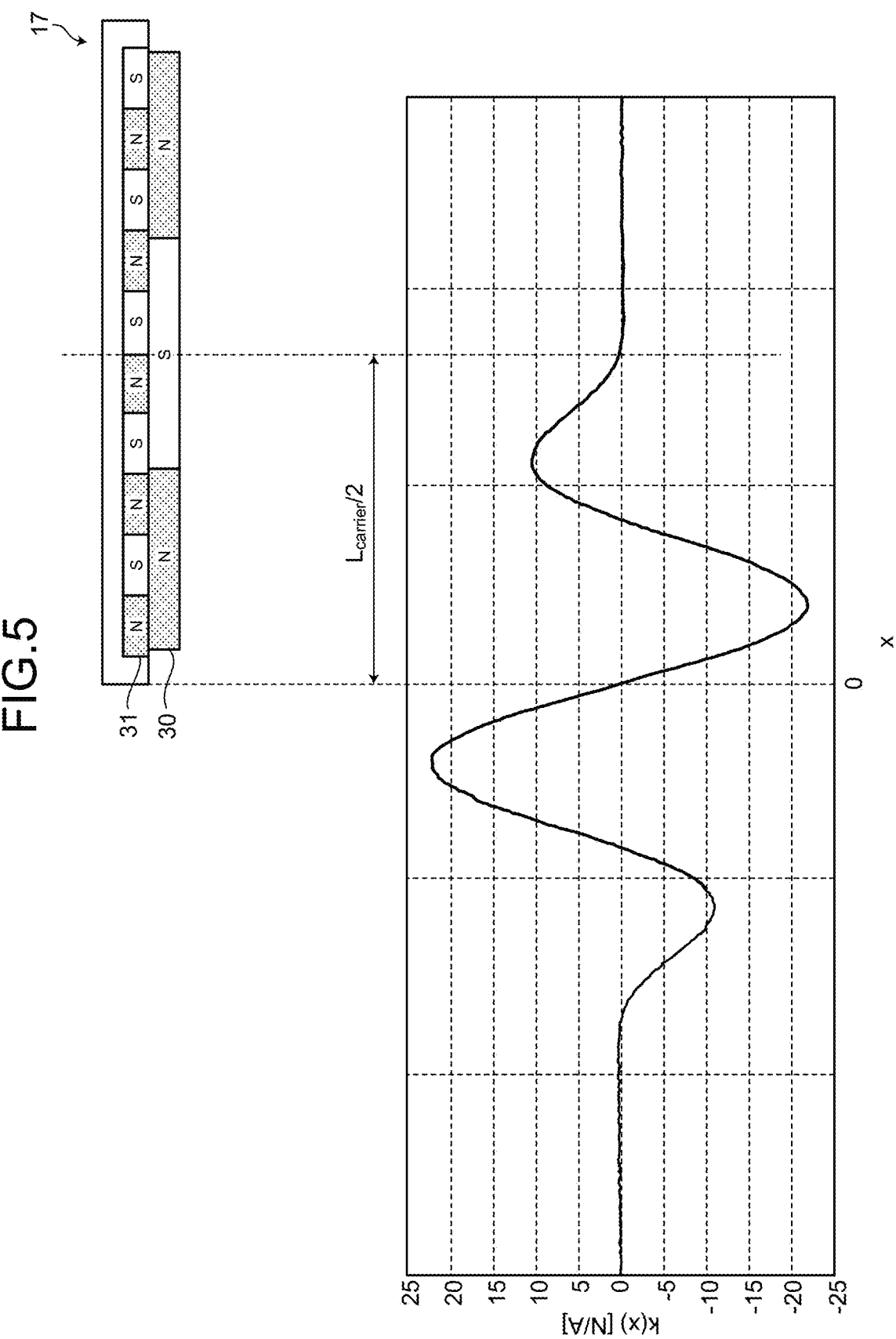
FIG. 5 is a diagram illustrating an example of a relationship between a position of a carrier and a thrust constant of a coil in the first embodiment.

FIG. 5 is a diagram illustrating an example of a relationship between a position of the carrier 17 and a thrust constant of the coil 21 in the first embodiment. FIG. 5 illustrates a graph indicating a relationship between a distance x based on the center position of the coil 21 in the traveling direction of the carrier 17 and a thrust constant k(x) of the coil 21. The thrust constant k(x) indicates a ratio of a thrust received by the carrier 17 to a current flowing through the coil 21. In FIG. 5, the vertical axis represents the thrust constant k(x), and the horizontal axis represents the distance x. In FIG. 5, the unit of the thrust constant k(x) is N/A. In FIG. 5, the unit of the distance x is any unit. In the following description, the center position of the coil 21 is the center position of the coil 21 in the traveling direction of the carrier 17. The center position of the carrier 17 is the center position of the carrier 17 in the traveling direction of the carrier 17.

FIG. 5 illustrates, as a reference, the carrier 17 when a front end of the carrier 17 in the traveling direction of the carrier 17 coincides with the center position of the coil 21. As the center position of the carrier 17 approaches the center position of the coil 21, a larger thrust can be generated with a smaller current by a relationship between the position of the coil 21 and the phase of the permanent magnet 30. The magnitude of the thrust varies depending on the relationship between the position of the coil 21 and the phase of the permanent magnet 30.

When the distance x from the center position of the coil 21 to the center position of the carrier 17 is longer than $L_{carrier}/2$ which is a length from the front end of the carrier 17 to the center position of the carrier 17, the thrust constant becomes zero, That is, when the distance x is longer than $L_{carrier}/2$, even if a current is caused to flow through the coil 21, the thrust that can be applied to the carrier 17 is not generated. Note that the graph illustrated in FIG. 5 is an example. The relationship between the position of the carrier 17 and the thrust constant of the coil 21 varies depending on how the permanent magnet 30 is disposed.

In the following description, the thrust constant k(x) for each of the coils 21 of each conveyance path unit 11 is expressed as "kAa(x)" or the like. "Aa" in "kAa(x)" indicates that it is the thrust constant k(x) of the coil 21a of the conveyance path unit 11A. For each coil 21 other than the coil 21a of the conveyance path unit 11A, the thrust constant k(x) for each of the coils 21 is expressed in the same manner as in the case of the coil 21a of the conveyance path unit 11A.

In addition, in the following description, the center position of each of the coils 21 of each conveyance path unit 11 is expressed as "pAa" or the like. "Aa" in "pAa" indicates that it is the center position of the coil 21a of the conveyance path unit 11A. For each coil 21 other than the coil 21a of the conveyance path unit 11A, the center position for each of the coils 21 is expressed in the same manner as in the case of the coil 21a of the conveyance path unit 11A.

Current commands $I_{cmdA}$_Aa, $I_{cmdA}$_Ab, . . . , $I_{cmdA}$_Hh, and $I_{cmdA}$_Hi for generating the thrust for moving the carrier 17A, each for one of the coils 21 of each conveyance path unit 11, are expressed by the following formulas. Note that $\tau A$ represents a thrust command $\tau$ of the carrier 17A. xA is a distance x from the center position of the coil 21 to the center position of the carrier 17A, and represents the actual position of the carrier 17A with respect to the coil 21.

$$I_{cmdA}\_Aa = kAa(xA-pAa) \times \tau A / \{Aa(xA-pAa)^2 + kAb(xA-pAb)^2 + \ldots + kHh(xA-pHh)^2 + kHi(xA-pHi)^2\}$$

$$I_{cmdA}\_Ab = kAb(xA-pAb) \times \tau A / \{kAa(zA-pAa)^2 + kAb(xA-pAb)^2 + \ldots + kHh(xA-pHh)^2 + kHi(xA-pHi)^2\}$$

$$I_{cmdA}\_Hh = kHh(xA-pHh) \times \tau A / \{kAa(xA-pAa)^2 + kAb(xA-pAb)^2 + \ldots + kHh(zA-pHh)^2 + kHi(xA-pHi)^2\}$$

$$I_{cmdA}\_Hi = kHi(xA-pHi) \times \tau A / \{kAa(xA-pAa)^2 + kAb(xA-pAb)^2 + \ldots + kHh(zA-pHh)^2 + kHi(xA-pHi)^2\}$$

In general, in a case where the thrust command $\tau$ and the thrust constant k(x) are given, there are an infinite number of sets of current commands of each coil 21 that realize the given thrust command t. A set of the current commands $I_{cmdA}$_Aa, $I_{cmdA}$_Ab, . . . , $I_{cmdA}$_Hh, and $I_{cmdA}$_Hi obtained by the above formula is a set that minimizes the sum of squares of the current flowing through the coils 21. That is, according to the above formula, the current commands $I_{cmdA}$_Aa, $I_{cmdA}$_Ab, . . . , $I_{cmdA}$_Hh, and $I_{cmdA}$_Hi that can minimize the copper loss of the coils 21 are obtained.

The current command generator 42 bundles the current commands $I_{cmdA}$_Aa, $I_{cmdA}$_Ab, . . . , $I_{cmdA}$_Hh, and $I_{cmdA}$_Hi to thereby generate the bundle of current commands $I_{cmdA}$ for the carrier 17A.

Also for the bundle of current commands $I_{cmdB}$ for the carrier 17B and the bundle of current commands $I_{cmdC}$ for the carrier 17C, the current command generator 42 performs calculation similarly to the case of the bundle of current commands $I_{cmdA}$ for the carrier 17A. In the procedure illustrated in FIG. 4, the calculations are performed in the order of the bundle of current commands $I_{cmdA}$, the bundle of current commands $I_{cmdB}$, and the bundle of current commands $I_{cmdC}$, but the bundles of current commands $L_{cmdA}$, $I_{cmdB}$, and $I_{cmdC}$ are calculated in any order.

Next, an example of a method for calculating the current command $I_{tot}$ for each of the coils 21 of each conveyance path unit 11 for generating thrusts for moving the carriers 17A, 17B, and 17C will be described. The current command generator 42 calculates the current command $I_{tot}$ for each of the coils 21 of each conveyance path unit 11 by using the bundles of current commands $I_{cmdA}$, $I_{cmdB}$, and $I_{cmdC}$. In the following description, the current command $I_{tot}$ for each of the coils 21 of each conveyance path unit 11 is expressed as "$I_{tot\_}Aa$" or the like. "Aa" in "$I_{tot\_}Aa$" indicates that it is the current command $I_{tot}$ for the coil 21a of the conveyance path unit 11A. For each coil 21 other than the coil 21a of the conveyance path unit 11A, the current command $I_{tot}$ for each of the coils 21 is expressed in the same manner as in the case of the coil 21a of the conveyance path unit 11A.

The current commands $I_{tot\_}Aa$, $I_{tot\_}Ab$, ..., $I_{tot\_}Hh$, and $I_{tot\_}Hi$, each for one of the coils 21 of each conveyance path unit 11, are expressed by the following formulas.

$$I_{tot\_}Aa = I_{cmdA\_}Aa + I_{cmdB\_}Aa + I_{cmdC\_}Aa$$

$$I_{tot\_}Ab = I_{cmdA\_}Ab + I_{cmdB\_}Ab + I_{cmdC\_}Ab$$

...

$$I_{tot\_}Hh = I_{cmdA\_}Hh + I_{cmdB}Hh + I_{cmdC\_}Hh$$

$$I_{tot\_}Hi = I_{cmdA\_}Hi + I_{cmdB}Hi + I_{cmdC\_}Hi$$

FIG. 6 is a diagram illustrating examples of calculation results of current commands by the conveyance system 1 according to the first embodiment. FIG. 6 illustrates examples of calculation results of the current commands $I_{tot\_}Aa$, $I_{tot\_}Aby$ ..., $I_{tot\_}Hh$, and $I_{tot\_}Hi$ by the above-described calculation method.

As illustrated in FIG. 5, when the distance x from the center position of the coil 21 to the center position of the carrier 17 is in the vicinity of $L_{carrier}/2$, the thrust constant k(x) becomes nearly zero, and the current flowing through the coil 21 hardly contributes to the generation of the thrust of the carrier 17. Therefore, for example, in a case where $I_{cmdA\_}Aa$ is a value other than zero, each of $L_{cmdB\_}Aa$ and $I_{cmdC\_}Aa$ becomes nearly zero, and $I_{tot\_}Aa = I_{cmdA\_}Aa$ substantially holds. As described above, it can be said that the number of carriers 17 on which each coil 21 can apply the thrust is substantially one, and one coil 21 does not simultaneously apply the thrust on two or more carriers 17.

In addition, when the conveyance system 1 is in the state illustrated in FIG. 1, there is no presence of the coil 21 of which the distance x is shorter than $L_{carrier}/2$ in the conveyance path unit 11B, for example, With the coil 21d which is one of the plurality of coils 21 provided in the conveyance path unit 11B as an example, a current command $I_{tot\_}Bd$ of the coil 21d is calculated as follows.

$$I_{tot\_}Bd$$

$$= I_{cmdA\_}Bd + I_{cmdC\_}Bd + I_{cmdC\_}Bd$$

$$= 0 \times \tau A / \{kAa(xA-pAa)^2 + kAb(xA-pAb)^2 + \ldots + kHh(xA-pHh)^2 + kHi(xA-pHi)^2\}$$

$$+ 0 \times \tau B / \{kAa(xA-pAa)^2 + kAb(xA-pAb)^2 + \ldots + kHh(xA-pHh)^2 + kHi(xA-pHi)^2\}$$

$$+ 0 \times \tau C / \{Aa(xA-pAa)^2 + kAb(xA-pAb)^2 + \ldots + kHh(xA-pHh)^2 + kHi(xA-pHi)^2\}$$

$$= 0$$

As described above, in a case where there is no presence of the coil 21 of which the distance x is shorter than $L_{carrier}/2$, the current command value for the coil 21 is calculated to be zero. That is, the current command generator 42 generates a current command in which the current command value is set to zero for the coil 21 at a position other than the position where the thrust can be applied to the carrier 17.

As described above, the current command generator 42 generates the current commands $I_{tot\_}Aa$, $I_{tot\_}Ab$, ..., $I_{tot\_}Hh$, and $I_{tot\_}Hi$ for all of the coils 21a, 21b, ..., and 21i of the conveyance path units 11A, 11B, ..., and 11H. The current command generator 42 generates current commands for performing current control of all of the plurality of coils 21 of each conveyance path unit 11 in all control cycles when controlling the plurality of conveyance path units 11.

The current command generator 42 generates the bundle of current commands $I_{cmd}$ in which the current commands $I_{tot\_}Aa$, $I_{tot\_}Ab$, ..., $I_{tot\_}Hh$, and $I_{tot\_}Hi$ are bundled. The current command generator 42 outputs the generated bundle of current commands $I_{cmd}$ to the communication master station 45. For example, the communication master station 45 transmits the current commands $I_{tot\_}Aa$, $I_{tot\_}Ab$, ..., and $I_{tot\_}Ai$ out of the bundle of current commands $I_{cmd}$ to the communication slave station 29 of the conveyance path unit 11A. The communication master station 45 transmits the current commands $I_{tot\_}Ha$, $I_{tot\_}Hb$, ..., and $I_{tot\_}Hi$ out of the bundle of current commands $I_{cmd}$ to the communication slave station 29 of the conveyance path unit 11H. As described above, the communication master station 45 transmits the current commands to the communication slave station 29 of each conveyance path unit 11.

According to the first embodiment, the current command generator 42 of the conveyance system 1 generates current commands for performing current control of all of the plurality of coils 21 of each conveyance path unit 11 in each control cycle when controlling the plurality of conveyance path units 11. The conveyance system 1 sends current commands not only for the coil 21 at a position where the thrust can be applied to the carrier 17 but also for all the coils 21 including the coil 21 at a position other than the position where the thrust can be applied to the carrier 17. Since the conveyance system 1 does not require a switch that performs switching between supply of the current to the coils 21 and interruption of the current flowing to the coils 21, a circuit configuration can be simplified. In addition, since the conveyance system 1 does not need to generate and output an opening/closing command for the switch separately from the current commands, it is possible to perform control by a simple program.

In a case where the coil 21 to be supplied with the current is selected from the plurality of coils 21 of each conveyance path unit 11, the current command is calculated only for the selected coil 21. On the other hand, in the case of the first embodiment, since the current command generator 42 uniformly generates the current commands for all the coils 21 of each conveyance path unit 11, a procedure of selecting the coil 21 and calculating the current command only for the selected coil 21 is unnecessary. Consequently, the conveyance system 1 can control each conveyance path unit 11 by a simple procedure.

The current command generator 42 generates a current command in which the current command value is set to zero for the coil 21 at a position other than the position where the thrust can be applied to the carrier 17. Even in a case where an induced current can be generated in the coil 21 at a position other than the position where the thrust can be applied to the carrier 17, the conveyance system 1 can perform adjustment to make the current zero by canceling the induced current. In the conveyance system 1, it is unnecessary to perform proof by cases for processes depending on the presence or absence of the carrier 17 at the position where the thrust can be applied thereto, and the procedure of the processes can be simplified.

Thus, the conveyance system 1 achieves an effect that a circuit configuration can be simplified and control can be performed by simple processes.

Second Embodiment

In the first embodiment, the current command generator 42 obtains the current commands for respective carriers 17 for each of the coils 21, and adds up the current commands for respective carriers 17 for each of the coils 21 to generate the current command for each coil 21. In a second embodiment, the current command generator 42 selects, for each coil 21, one carrier 17 closest to the coil 21 among the plurality of carriers 17, and obtains a current command that applies a thrust to the selected carrier 17, thereby generating a current command for each coil 21. In the second embodiment, the same components as those in the first embodiment are denoted by the same reference numerals as those therein, and configurations different from those in the first embodiment will mainly be described.

FIG. 7 is a diagram illustrating an exemplary configuration of the conveyance path unit 11 included in the conveyance system 1 according to the second embodiment. FIG. 7 illustrates a part of the configuration of the conveyance path unit 11 and two carriers 17A and 17B. FIG. 7 illustrates a case where two carriers 17A and 17B are present on the conveyance path unit 11A which is one of the plurality of conveyance path units 11 of the conveyance system 1. In the conveyance system 1, in addition to the case where two carriers 17 are present on one conveyance path unit 11 as illustrated in FIG. 7, there are a case where one carrier 17 is present on one conveyance path unit 11 and a case where no carrier 17 is present on one conveyance path unit 11.

In the state illustrated in FIG. 7, the carrier 17 located at the closest position from the center position of the coil $21a$ in the traveling direction of the carrier 17 is the carrier 17A. With the use of $\tau A$ which is the thrust command $\tau$ for the carrier 17A and xA which is the distance x for the carrier 17A, the current command generator 42 calculates the current command $I_{tot\_}Aa$ for the coil $21a$ of the conveyance path unit 11A in accordance with the following formula.

$I_{tot\_}Aa$ $= I_{cmdA\_}Aa$ $= kAa(xA-pAa) \times \tau A / \{kAa(xA-pAa)^2 + kAb(xA-pAb)^2 + \ldots + kHh(xA-pHh)^2 + kHi(xA-pHi)^2\}$ In a case different from the case illustrated in FIG. 7, if the carrier 17 is present at a position far away from the center position of the coil $21a$, $kAa(xA-pAa)=0$ holds by the relationship illustrated in FIG. 5. In that case, the coil $21a$ does not generate the thrust that can be applied to the carrier 17.

In the state illustrated in FIG. 7, for example, the carrier 17 located at the closest position from the center position of the coil $21e$ in the traveling direction of the carrier 17 is the carrier 17B. With the use of $\tau B$ which is the thrust command $\tau$ for the carrier 17B and xB which is the distance x for the carrier 17B, the current command generator 42 calculates the current command $I_{tot\_}Ae$ for the coil $21e$ of the conveyance path unit 11A in accordance with the following formula.

$I_{tot\_}Ae$ $= I_{cmdA\_}Ae$ $= kAe(zB-pAe) \times \tau B / \{kAa(xB-pAa)^2 + kAb(xB-pAb)^2 + \ldots + kHh(xB-pHh)^2 + kHi(xB-pHi)^2\}$ In the state illustrated in FIG. 7, for example, the carrier 17 located at the closest position from the center position of the coil $21d$ in the traveling direction of the carrier 17 is the carrier 17A. With the use of $\tau A$ which is the thrust command $\tau$ for the carrier 17A and xA which is the distance x for the carrier 17A, the current command generator 42 calculates the current command $I_{tot\_}Ad$ for the coil $21d$ of the conveyance path unit 11A in accordance with the following formula.

$I_{tot\_}Ad$ $= I_{cmdA\_}Ad$ $= kAd(xA-pAd) \times \tau A / \{kAa(xA-pAa)^2 + kAb(xA-pAb)^2 + \ldots + kHh(xA-pHh)^2 + kHi(xA-pHi)^2\}$ In the state illustrated in FIG. 7, a part of the carrier 17B is also present on the coil $21d$. However, since the distance x from the center position of the coil $21d$ to the center position of the carrier 17 is longer than the length from the front end of the carrier 17B to the center position of the carrier 17B, the thrust constant of the thrust that can be applied by the coil $21d$ to the carrier 17B becomes nearly zero in accordance with the relationship illustrated in FIG. 5. Since a magnetic flux generated by the coil $21d$ hardly contributes to the movement of the carrier 17B, the current command $I_{cmdA\_}Ad$ based on $\tau A$ and xA for the carrier 17A can be used as the current command $I_{tot\_}Ad$ for the coil $21d$ as it is.

FIG. 8 is a diagram illustrating an example of a thrust command used to generate a current command for each coil 21 in the conveyance system 1 according to the second embodiment. FIG. 8 illustrates, for each of the coils $21a$ to $21i$ in the state illustrated in FIG. 7, the carrier 17 located closest to the center position of the coil 21 and the thrust command $\tau$ used for generating the current command. As for the coils $21a$ to $21d$, the carrier 17 located closest to the center position of the coil 21 is the carrier 17A. The thrust command $\tau$ used for generating the current command for each of the coils $21a$ to $21d$ is $\tau A$. As for the coils $21e$ to $21i$, the carrier 17 located closest to the center position of the coil 21 is the carrier 17B. The thrust command $\tau$ used for generating the current command for each of the coils $21e$ to $21i$ is $\tau B$.

As described above, the current command generator 42 selects, for each coil 21, one carrier 17 closest to the coil 21 among the plurality of carriers 17, and obtains a current command that applies a thrust to the selected carrier 17, thereby generating a current command for each coil 21. The current command generator 42 also calculates a current command for each coil 21 of each of the conveyance path units 11B to 11H similarly to the case of the current command for each coil 21 of the conveyance path unit 11A.

The current command generator 42 generates the bundle of current commands $I_{cmd}$ in which current commands for the coils 21 of each conveyance path unit 11 are bundled. The current command generator 42 outputs the generated bundle of current commands $I_{cmd}$ to the communication master station 45. For example, the communication master station 45 transmits the current commands $I_{tot\_}Aa$, $I_{tot\_}Ab$, . . . , and $I_{tot\_}Ai$ out of the bundle of current commands $I_{cmd}$ to the communication slave station 29 of the conveyance path unit 11A, The communication master station 45 transmits the current commands $I_{tot\_}Ha$, $I_{tot\_}Hb$, . . . , and $I_{tot\_}Hi$ out of the bundle of current commands $I_{cmd}$ to the communication slave station 29 of the conveyance path unit 11H. As described above, the communication master station 45 transmits the current commands to the communication slave station 29 of each conveyance path unit 11.

According to the second embodiment, the current command generator 42 of the conveyance system 1 generates current commands for performing current control of all of the plurality of coils 21 of each conveyance path unit 11 in each control cycle when controlling the plurality of conveyance path units 11. Consequently, the conveyance system 1 achieves an effect that a circuit configuration can be simplified and control can be performed by simple processes.

Furthermore, the current command generator 42 selects, for each coil 21, one carrier 17 closest to the coil 21 among the plurality of carriers 17, and obtains a current command that applies a thrust to the selected carrier 17. Since the current command generator 42 calculates the current command corresponding to the selected carrier 17 for each coil 21, the amount of calculation can be reduced as compared with the case of calculating the current command corresponding to each of the plurality of carriers 17 for each coil 21. Consequently, the conveyance system 1 can reduce the amount of calculation for control.

Third Embodiment

In a third embodiment, an example will be described in which a thrust command is corrected on the basis of a thrust command correction value and machine learning is applied to calculation of the thrust command correction value. In the third embodiment, the same components as those in the first or second embodiment are denoted by the same reference numerals as those therein, and configurations different from those in the first or second embodiment will mainly be described.

In each conveyance path unit 11, the coils 21 are arranged at regular intervals, but continuity of the arrangement of the coils 21 is interrupted at a connection portion between the conveyance path units 11 in the conveyance path 10. Therefore, at the connection portion between the conveyance path units 11, a cogging torque different from a cogging torque generated between the coils 21 in the conveyance path unit 11 is generated, and the cogging torque fluctuates. Since the alignment of the conveyance path units 11 is often performed by a user and a misalignment between the conveyance path units 11 is likely to occur, it is difficult to assume a correction value for correcting the cogging torque at the connection portion between the conveyance path units 11 in advance. In a case where the correction value is obtained after the assembly of the conveyance path 10 is actually completed, it is necessary to accurately measure the cogging torque at the connection portion between the conveyance path units 11, so that the number of man-hours in the assembly of the conveyance path 10 increases.

In the third embodiment, by calculating the thrust command correction value calculated by machine learning to correct the thrust command, the cogging torque can be corrected with high accuracy, and the number of man-hours in assembling the conveyance path 10 can be reduced. In the third embodiment, the thrust command correction value is a correction value used for correction of the thrust command.

Figure 9:
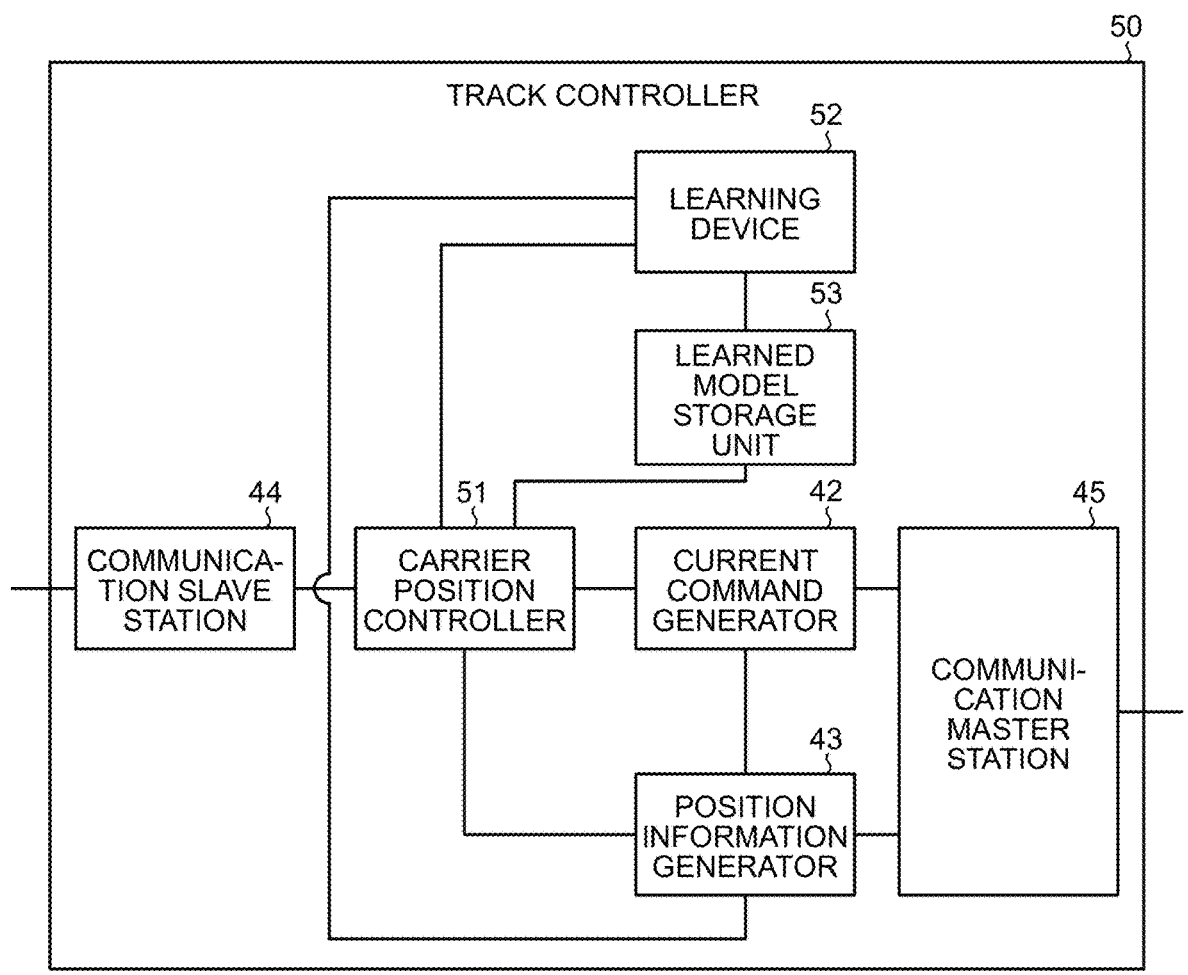
FIG. 9 is a diagram illustrating an exemplary configuration of a track controller included in the conveyance system according to a third embodiment.

FIG. 9 is a diagram illustrating an exemplary configuration of a track controller 50 included in the conveyance system 1 according to the third embodiment. The track controller 50 includes the current command generator 42, the position information generator 43, the communication slave station 44, the communication master station 45, a carrier position controller 51, a learning device 52, and a learned model storage unit 53.

The carrier position controller 51 acquires a position command of each carrier 17 and position information of each carrier 17. The carrier position controller 51 generates a thrust command of each carrier 17 on the basis of a difference between the position command and the position information. In addition, the carrier position controller 51 acquires a learned model from the learned model storage unit 53, and obtains the thrust command correction value on the basis of the learned model and the position information of each carrier 17. The carrier position controller 51 corrects the thrust command by using the thrust command correction value and outputs the corrected thrust command to the current command generator 42.

The learning device 52 acquires the position information and the thrust command correction value of each carrier 17. The learning device 52 learns a thrust command correction value that enables highly accurate correction of the cogging torque. The learning device 52 outputs a learned model which is a result of the learning. The learned model storage unit 53 stores the learned model.

Figure 10:
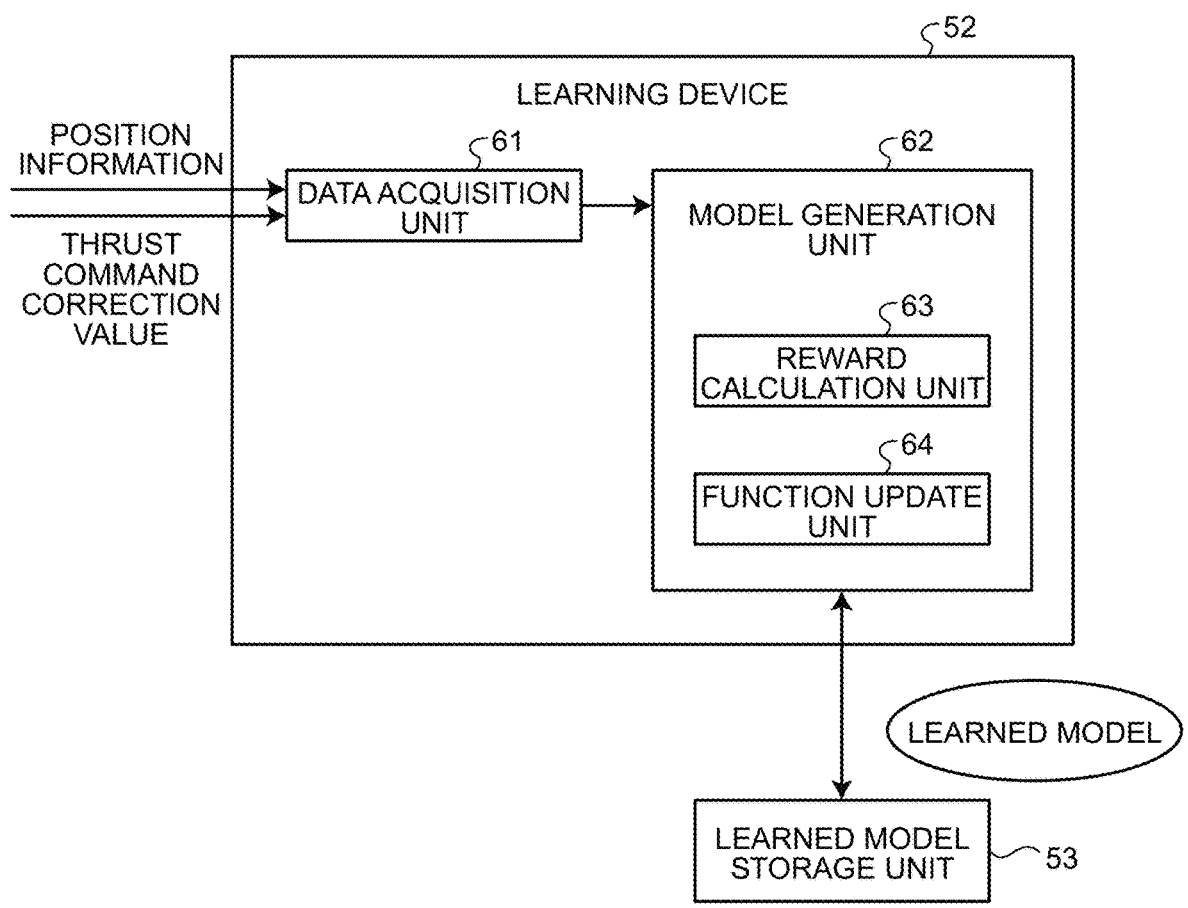
FIG. 10 is a diagram illustrating an exemplary configuration of a learning device included in the conveyance system according to the third embodiment.

FIG. 10 is a diagram illustrating an exemplary configuration of the learning device 52 included in the conveyance system 1 according to the third embodiment. The learning device 52 includes a data acquisition unit 61 and a model generation unit 62, The data acquisition unit 61 acquires learning data and creates a data set obtained by combining the learning data. The learning data is position information and a thrust command correction value of each carrier 17. That is, the data acquisition unit 61 acquires learning data including the position information and the thrust command correction value. The data acquisition unit 61 acquires the position information from the position information generator 43. The data acquisition unit 61 acquires the thrust command correction value from the carrier position controller 51.

The model generation unit 62 generates a learned model by using the learning data. The model generation unit 62 generates a learned model to be used for inference of a thrust command correction value from position information on the basis of the learning data. The model generation unit 62 outputs the generated learned model. The learned model is stored in the learned model storage unit 53. Note that the model generation unit 62 may read a learned model that has been already generated from the learned model storage unit 53, and update the learned model by relearning in accordance with the learning data.

As a learning algorithm used by the model generation unit 62, a known algorithm such as supervised learning, unsupervised learning, or reinforcement learning can be used. As an example, a case will be described where reinforcement learning is applied to a learning algorithm used by the model generation unit 62. Reinforcement learning is learning in which a subject of action as an agent in an environment observes the current state and decides what action to take. The agent gets a reward from the environment by selecting an action, and learns a policy with which a maximum reward is obtained through a series of actions. As representative methods of reinforcement learning, Q-learning, TD-learning, and the like are known. For example, in a case of Q-learning, an action-value table which is a general update formula for an action-value function Q(s,a) is expressed by the following formula (1). The action-value function Q(s,a)

indicates an action value Q which is a value of an action of selecting an action "a" under an environment "s".

Formula 1:

$$Q(s_t,a_t) \leftarrow Q(s_t,a_t)+\alpha(r_{t+1}+\gamma \max_a Q(s_{t+1},a_t)-Q(s_t,a_t)) \quad (1)$$

In the formula (1), "$s_t$" represents an environment at time "t". "$a_t$" represents an action at time "t". The action "$a_t$" changes the environment to "$s_{t+1}$". "$r_{t+1}$" represents a reward given by the change in the environment. "γ" represents a discount rate. "α" represents a learning coefficient. In the third embodiment, the position information is the environment "$s_t$". The thrust command correction value is the action "$a_t$".

The update formula expressed by the formula (1) increases an action value Q if an action value of best action "a" at time "t+1" is larger than an action value Q of action "a" executed at time "t", and decreases the action value Q if opposite is true. In other words, the action-value function Q(s,a) is updated so that the action value Q of action "a" at time "t" approaches a best action value at time "t+1". Consequently, a best action value in a certain environment is sequentially propagated to action values in the previous environments.

The model generation unit 62 includes a reward calculation unit 63 and a function update unit 64, The reward calculation unit 63 calculates a reward on the basis of the data set. The function update unit 64 updates a function for determining a thrust command correction value in accordance with the reward calculated by the reward calculation unit 63.

Specifically, the reward calculation unit 63 calculates a reward "r" on the basis of variability of the speed of the carrier 17. The variability of the speed of the carrier 17 is obtained on the basis of, for example, the position information of the carrier 17. For example, in a case where the variability of the speed of the carrier 17 becomes small, the reward calculation unit 63 increases the reward "r". The reward calculation unit 63 increases the reward "r" by giving "1" which is a value of the reward. Note that the value of the reward is not limited to "1". On the other hand, in a case where the variability of the speed of the carrier 17 becomes large, the reward calculation unit 63 decreases the reward "r". The reward calculation unit 63 decreases the reward "r" by giving "−1" which is a value of the reward. Note that the value of the reward is not limited to "−1".

The function update unit 64 updates a function which is a model for determining a thrust command correction value in accordance with the reward calculated by the reward calculation unit 63, The function can be updated in accordance with the data set, for example, by updating the action-value table. The action value table is a data set in which any action and an action value thereof are stored in association with each other in a form of a table. For example, in the case of Q learning, an action value function $Q(s_t,a_t)$ expressed by the above formula (1) is used as a function for determining the thrust command correction value.

Figure 11:
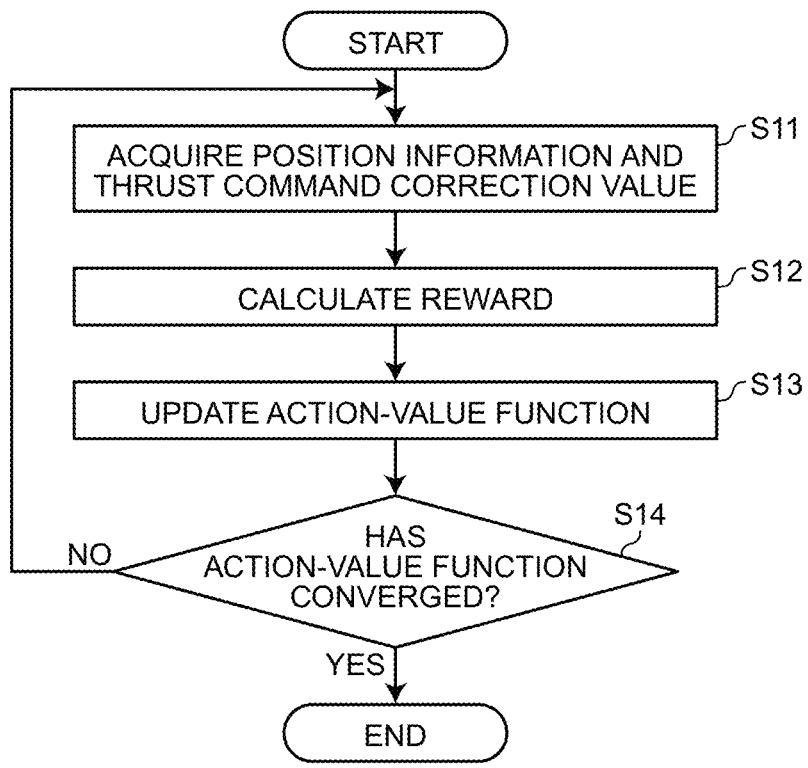
FIG. 11 is a flowchart illustrating a processing procedure of the learning device included in the conveyance system according to the third embodiment.

FIG. 11 is a flowchart illustrating a processing procedure of the learning device 52 included in the conveyance system 1 according to the third embodiment, A reinforcement learning method of updating the action-value function Q(s,a) will be described with reference to the flowchart of FIG. 11.

In step S11, the learning device 52 acquires, by the data acquisition unit 61, position information and a thrust command correction value of each carrier 17. That is, the learning device 52 acquires learning data. The data acquisition unit 61 outputs a data set collectively including the learning data to the model generation unit 62.

In step S12, the learning device 52 calculates a reward by the reward calculation unit 63. The reward calculation unit 63 calculates a reward for a combination of the position information of each carrier 17 and the thrust command correction value for each carrier 17. The reward calculation unit 63 increases or decreases the reward on the basis of the variability of the speed of the carrier 17.

In step S13, the learning device 52 updates the action-value function by the function update unit 64. The function update unit 64 updates the action-value function Q(s,a) on the basis of the reward calculated in step S12. The learning device 52 updates the action-value function $Q(s_t,a_t)$ stored in the learned model storage unit 53.

In step S14, the learning device 52 determines, by the function update unit 64, whether the action-value function Q(s,a) has converged. The function update unit 64 determines that the action-value function Q(s,a) has converged when the action-value function Q(s,a) is no longer updated in step S13.

If the function update unit 64 determines that the action-value function Q(s,a) has not converged (step S14, No), the learning device 52 returns the procedure to step S11. On the other hand, if the function update unit 64 determines that the action-value function Q(s,a) has converged (step S14, Yes), the learning device 52 ends the processes in accordance with the procedure illustrated in FIG. 11. Note that the learning device 52 may continue learning by returning the procedure from step S13 to step S11 without making the determination in step S14. The learned model storage unit 53 stores a learned model which is the generated action-value function Q(s,a).

In the third embodiment, the case has been described where reinforcement learning is applied to the learning algorithm used by the learning device 52, but learning other than reinforcement learning may be applied to the learning algorithm. The learning device 52 may execute machine learning by using a known learning algorithm other than reinforcement learning, for example, a learning algorithm such as deep learning, a neural network, genetic programming, inductive logic programming, or a support vector machine.

The learning device 52 illustrated in FIGS. 9 and 10 is a device built in the track controller 50. The learning device 52 may be a device outside the track controller 50. The learning device 52 which is a device outside the track controller 50 constitutes the conveyance system 1. The learning device 52 may be a device connectable to the track controller 50 via a network. The learning device 52 may be a device present on a cloud server.

The learning device 52 may learn a relationship between the position information and the thrust command correction value in accordance with a data set created for a plurality of conveyance systems 1. The learning device 52 may acquire learning data from a plurality of conveyance systems 1 used in the same place, or may acquire learning data from a plurality of conveyance systems 1 used in places different from each other. The learning data may be collected from a plurality of conveyance systems 1 that operate independently from each other in a plurality of places. After the collection of the learning data from such a plurality of conveyance systems 1 is started, a new conveyance system 1 may be added as a target from which the learning data is collected. In addition, after the collection of the learning data from the plurality of conveyance systems 1 is started, some of the plurality of conveyance systems 1 may be excluded from targets from which the learning data is collected.

The learning device 52 that has learned one conveyance system 1 may learn another conveyance system 1 other than the one conveyance system 1. The learning device 52 that performs learning for the another conveyance system 1 can update the learned model by relearning in the another conveyance system 1.

Figure 12:
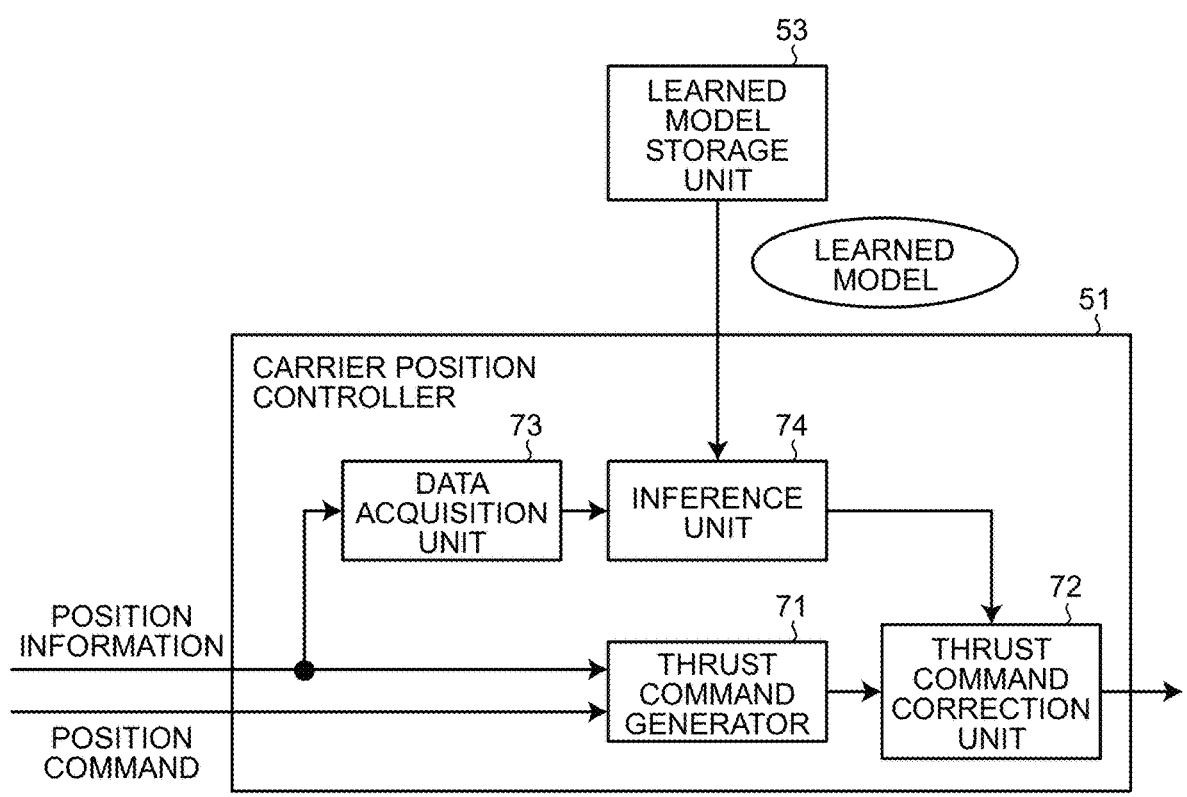
FIG. 12 is a diagram illustrating an exemplary configuration of a carrier position controller included in the conveyance system according to the third embodiment.

FIG. 12 is a diagram illustrating an exemplary configuration of the carrier position controller 51 included in the conveyance system 1 according to the third embodiment. The carrier position controller 51 includes a thrust command generator 71, a thrust command correction unit 72, a data acquisition unit 73, and an inference unit 74. The data acquisition unit 73 and the inference unit 74 function as an inference device that infers a thrust command correction value from position information of each carrier 17.

The thrust command generator 71 acquires a position command of each carrier 17 and position information of each carrier 17. The thrust command generator 71 generates a thrust command for each carrier 17 on the basis of a difference between the position command for each of the carriers 17 and the position information for each of the carriers 17. The thrust command generator 71 outputs the generated thrust command to the thrust command correction unit 72.

The data acquisition unit 73 acquires inference data. The inference data is position information of each of the plurality of carriers 17 included in the conveyance system 1. The data acquisition unit 73 acquires the position information from the position information generator 43. The inference unit 74 reads the learned model generated by the learning device 52 from the learned model storage unit 53. The inference unit 74 infers the thrust command correction value by inputting the inference data to the learned model. The inference unit 74 outputs the thrust command correction value which is a result of the inference to the thrust command correction unit 72. The thrust command correction unit 72 corrects the thrust command of each carrier 17 by using the thrust command correction value. The thrust command correction unit 72 outputs the corrected thrust command.

Figure 13:
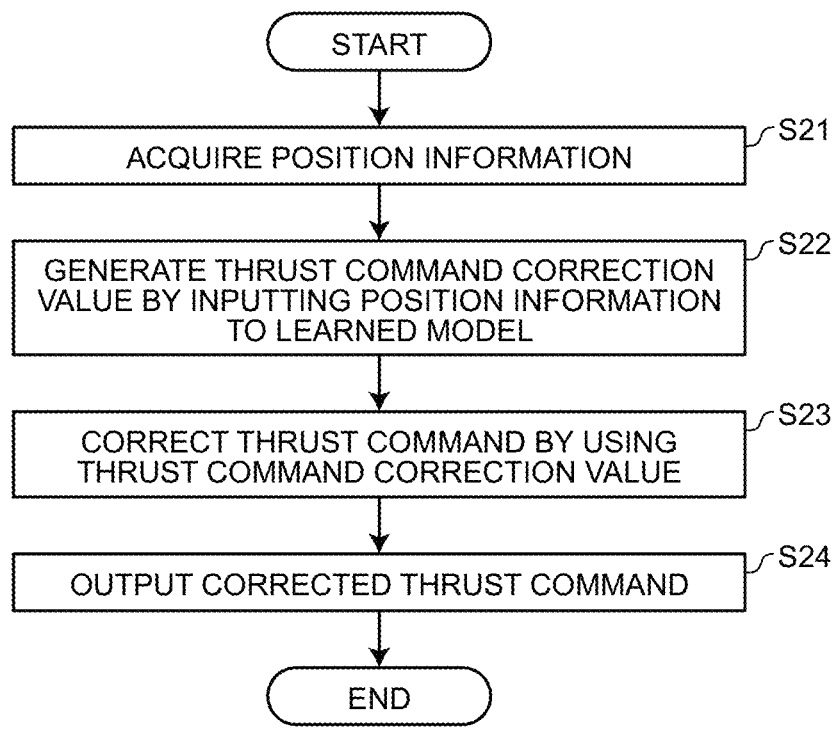
FIG. 13 is a flowchart illustrating a processing procedure of the carrier position controller included in the conveyance system according to the third embodiment.

FIG. 13 is a flowchart illustrating a processing procedure of the carrier position controller 51 included in the conveyance system 1 according to the third embodiment. The carrier position controller 51 acquires a position command of each carrier 17 and position information of each carrier 17 by the thrust command generator 71. The thrust command generator 71 generates a thrust command of each carrier 17 on the basis of the position command and the position information.

In step S21, the carrier position controller 51 acquires position information of each carrier 17 by the data acquisition unit 73. The data acquisition unit 73 outputs the acquired position information to the inference unit 74. In step S22, the carrier position controller 51 generates, by the inference unit 74, a thrust command correction value by inputting the position information to the learned model. The inference unit 74 outputs the generated thrust command correction value to the thrust command correction unit 72.

In step S23, the carrier position controller 51 corrects, by the thrust command correction unit 72, the thrust command by using the thrust command correction value. In step S24, the carrier position controller 51 outputs the thrust command corrected by the thrust command correction unit 72. Thus, the carrier position controller 51 ends the processes in accordance with the procedure illustrated in FIG. 13. The current command generator 42 generates a current command on the basis of the thrust command and the position information of each carrier 17 acquired from the carrier position controller 51.

According to the third embodiment, the conveyance system 1 learns, by the learning device 52, the thrust command correction value that enables highly accurate Correction of the cogging torque. With the carrier position controller 51 including the data acquisition unit 73 and the inference unit 74, the conveyance system 1 infers the thrust command correction value that enables highly accurate correction of the cogging torque. In the conveyance system 1, by correcting the thrust command on the basis of the thrust command correction value which is a result of the inference, the cogging torque can be corrected with high accuracy, and the number of man-hours in assembling the conveyance path 10 can be reduced.

Next, hardware that realizes the track controllers 20 and 50 according to the first to third embodiments will be described. The track controllers 20 and 50 are realized by a processing circuitry. The processing circuitry may be a circuit in which a processor executes software, or may be a dedicated circuit.

Figure 14:
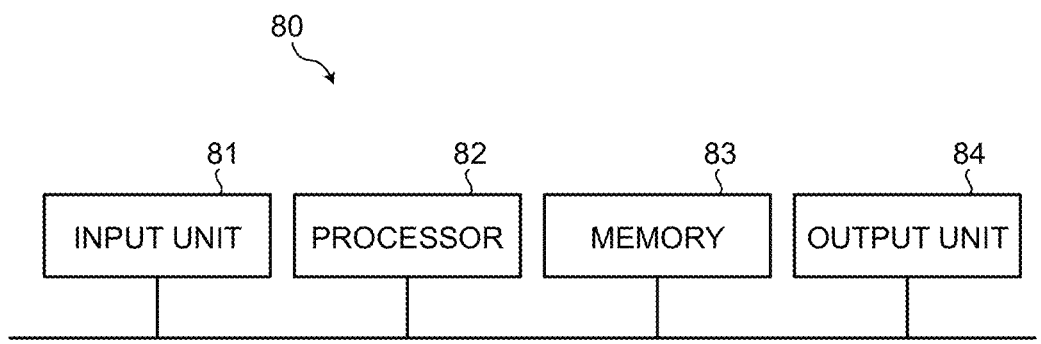
FIG. 14 is a diagram illustrating an exemplary configuration of a control circuit according to the first to third embodiments.

In a case where the processing circuitry is realized by software, the processing circuitry is, for example, a control circuit illustrated in FIG. 14. FIG. 14 is a diagram illustrating an exemplary configuration of a control circuit 80 according to the first to third embodiments. The control circuit 80 includes an input unit 81, a processor 82, a memory 83, and an output unit 84. The input unit 81 is an interface circuit that receives data input from the outside of the control circuit 80 and gives the data to the processor 82. The output unit 84 is an interface circuit that sends data from the processor 82 or the memory 83 to the outside of the control circuit 80.

In a case where the processing circuitry is the control circuit 80 illustrated in FIG. 14, the track controllers 20 and 50 are realized by software, firmware, or a combination of software and firmware. The software or the firmware is described as a program and stored in the memory 83. The processing circuitry realizes functions of the track controllers 20 and 50 by the processor 82 reading and executing a program stored in the memory 83. That is, the processing circuitry includes the memory 83 for storing a program with which a process of each of the track controllers 20 and 50 is executed as a result. It can also be said that these programs cause a computer to execute procedures and methods of the track controllers 20 and 50.

The processor 82 is a CPU. The processor 82 may be a central processing device, a processing device, an arithmetic device, a microprocessor, a microcomputer, a processor, or a DSP. The memory 83 corresponds to, for example, a non-volatile or volatile semiconductor memory such as a random access memory (RAM), a read only memory (ROM), a flash memory, an erasable programmable read only memory (EPROM), or an electrically erasable programmable read only memory (EEPROM (registered trademark)), a magnetic disk, a flexible disk, an optical disk, a compact disc, a mini disk, or a digital versatile disc (DVD).

Figure 15:
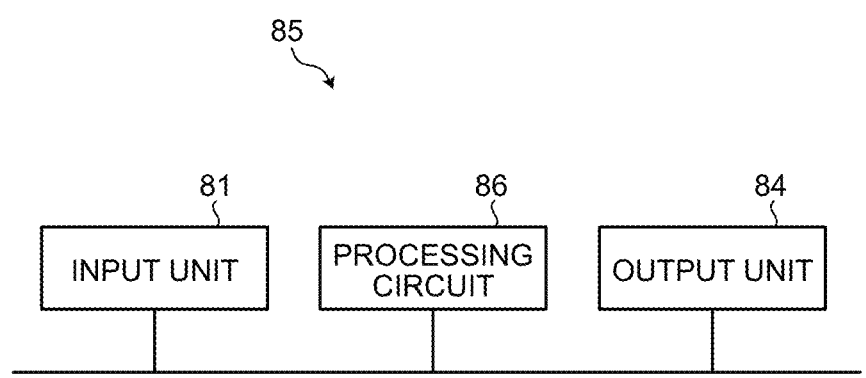
FIG. 15 is a diagram illustrating an exemplary configuration of a hardware circuit as a dedicated circuit according to the first to third embodiments.

FIG. 14 is an example of hardware in a case where the track controllers 20 and 50 are each realized by the processor 82 and the memory 83 for general-purpose use, but the track controllers 20 and 50 may be each realized by a dedicated hardware circuit. FIG. 15 is a diagram illustrating an exemplary configuration of a hardware circuit 85 as a dedicated circuit according to the first to third embodiments.

The hardware circuit 85 as a dedicated circuit includes the input unit 81, the output unit 84, and a processing circuit 86. The processing circuit 86 is a single circuit, a composite circuit, a programmed processor, a parallel programmed processor, an application specific integrated circuit (ASIC), a field programmable gate array (FPGA), or a circuit obtained by combination thereof. Functions of the track controllers 20 and 50 may be separately realized by the processing circuit 86, or the functions may be collectively realized by the processing circuit 86. Note that the track controllers 20 and 50 may be realized by combining the control circuit 80 and the hardware circuit 85.

The motion controller 19 illustrated in FIG. 1 is realized by a processing circuitry similarly to the track controllers 20 and 50. The processing circuitry that realizes the motion controller 19 is the control circuit 80 illustrated in FIG. 14 or the hardware circuit 85 as a dedicated circuit illustrated in FIG. 15.

Specific distributed or integrated modes of the components in the conveyance system 1 according to the first to third embodiments are not limited to those described in the first to third embodiments. All or some of the components of the conveyance system 1 may be configured to be functionally or physically distributed or integrated in any unit. For example, the controller 12 illustrated in FIG. 1 is not limited to the motion controller 19 and the track controller 20 which are separated from each other, and may be realized by one device.

The configurations described in the respective embodiments above are merely examples of the content of the present disclosure. The configurations of the respective embodiments can be combined with other known technology. The configurations of the respective embodiments may be appropriately combined. Part of the configurations of the respective embodiments can be omitted or modified without departing from the gist of the present disclosure.

REFERENCE SIGNS LIST

1 conveyance system; 10 conveyance path; 11; 11A-11H conveyance path unit; 12 controller; 13 DC power supply; 14, 15 data communication line; 16 DC power supply bus; 17, 17A, 17B, 17C carrier; 18A, 18B arrow; 19 motion controller; 20, 50 track controller; 21, 21a-21i coil; 22 inverter circuit; 23 current sensor; 24 capacitor; 25 current controller; 26 linear scale; 27 position sensor; 28, 82 processor; 29, 44 communication slave station; 30, 31 permanent magnet; 41, 51 carrier position controller; 42 current command generator; 43 position information generator; 45 communication master station; 52 learning device; 53 learned model storage unit; 61, 73 data acquisition unit; 62 model generation unit; 63 reward calculation unit; 64 function update unit; 71 thrust command generator; 72 thrust command correction unit; 74 inference unit; 80 control circuit; 81 input unit; 83 memory; 84 output unit; 85 hardware circuit; 86 processing circuit.

The invention claimed is:

1. A conveyance system comprising:
    a plurality of conveyors constituting a conveyance path on which a conveyance body moves, each of the conveyors including a plurality of drivers that each generate a thrust for moving the conveyance body by a current flowing therethrough; and
    a controller including a current command generator that generates a current command for controlling a current flowing through the plurality of drivers, wherein each of the plurality of conveyors controls the current flowing through each of the plurality of drivers in accordance with the current command, and
    the current command generator generates a current command for performing current control of all of the plurality of drivers of each of the conveyors at each control cycle when the current command is generated, wherein
    the plurality of conveyors move each of the plurality of conveyance bodies by applying the thrust to each of the plurality of conveyance bodies, and
    the current command generator obtains a current command for each of the conveyance bodies for each of the drivers, and adds up current commands for the conveyance bodies for each of the drivers to generate a current command for each of the drivers.

2. The conveyance system according to claim 1, wherein a disposition interval of the plurality of drivers in a traveling direction of the conveyance body is shorter than a length of the conveyance body in the traveling direction.

3. The conveyance system according to claim 2, wherein the controller generates a thrust command for the conveyance body on a basis of a position command indicating a position to which the conveyance body is moved and position information indicating a result of detection of the position of the conveyance body, and generates the current command on a basis of the thrust command and the position information.

4. The conveyance system according to claim 3, comprising:
    a data acquisition circuitry to acquire learning data including a correction value used to correct the thrust command and the position information; and
    a model generation circuitry to generate a learned model used for inference of the correction value from the position information on a basis of the learning data, wherein
    the controller corrects the thrust command on a basis of the correction value inferred by using the learned model, and
    the current command generator generates the current command on a basis of the thrust command that has been corrected and the position information.

5. The conveyance system according to claim 1, comprising:
    the conveyance body that is plural in number, wherein
    the conveyance body is provided with a permanent magnet, and
    the driver includes a coil that generates an electromagnetic force that is the thrust by an interaction between a current and a magnetic field generated by the permanent magnet.

6. The conveyance system according to claim 5, wherein a length of the permanent magnet in a traveling direction of the conveyance body is shorter than a length of the conveyance body in the traveling direction.

7. The conveyance system according to claim 6, wherein the controller generates a thrust command for the conveyance body on a basis of a position command indicating a position to which the conveyance body is moved and position information indicating a result of detection of the position of the conveyance body, and generates the current command on a basis of the thrust command and the position information.

8. The conveyance system according to claim 7, comprising:
- a data acquisition circuitry to acquire learning data including a correction value used to correct the thrust command and the position information; and
- a model generation circuitry to generate a learned model used for inference of the correction value from the position information on a basis of the learning data, wherein
- the controller corrects the thrust command on a basis of the correction value inferred by using the learned model, and
- the current command generator generates the current command on a basis of the thrust command that has been corrected and the position information.

9. The conveyance system according to claim 5, wherein the controller generates a thrust command for the conveyance body on a basis of a position command indicating a position to which the conveyance body is moved and position information indicating a result of detection of the position of the conveyance body, and generates the current command on a basis of the thrust command and the position information.

10. The conveyance system according to claim 9, comprising:
- a data acquisition circuitry to acquire learning data including a correction value used to correct the thrust command and the position information; and
- a model generation circuitry to generate a learned model used for inference of the correction value from the position information on a basis of the learning data, wherein
- the controller corrects the thrust command on a basis of the correction value inferred by using the learned model, and
- the current command generator generates the current command on a basis of the thrust command that has been corrected and the position information.

11. The conveyance system according to claim 1, wherein the controller generates a thrust command for the conveyance body on a basis of a position command indicating a position to which the conveyance body is moved and position information indicating a result of detection of the position of the conveyance body, and generates the current command on a basis of the thrust command and the position information.

12. The conveyance system according to claim 11, comprising:
- a data acquisition circuitry to acquire learning data including a correction value used to correct the thrust command and the position information; and
- a model generation circuitry to generate a learned model used for inference of the correction value from the position information on a basis of the learning data, wherein
- the controller corrects the thrust command on a basis of the correction value inferred by using the learned model, and
- the current command generator generates the current command on a basis of the thrust command that has been corrected and the position information.

13. The conveyance system according to claim 1, wherein the current command generator sets a current command value for at least one of the plurality of drivers to zero.

* * * * *